(12) United States Patent
Umemura et al.

(10) Patent No.: US 11,274,221 B2
(45) Date of Patent: Mar. 15, 2022

(54) INK, INK SET, INK CONTAINER, IMAGE FORMING METHOD, IMAGE FORMING APPARATUS AND RECORDED MATTER

(71) Applicant: RICOH COMPANY, LTD., Tokyo (JP)

(72) Inventors: Kazuhiko Umemura, Kanagawa (JP); Yuuki Yokohama, Kanagawa (JP); Akihiko Matsuyama, Kanagawa (JP); Amika Sagara, Tokyo (JP); Masaki Kudo, Kanagawa (JP); Mayumi Yoshihara, Kanagawa (JP); Kento Sugita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 681 days.

(21) Appl. No.: 16/169,621

(22) Filed: Oct. 24, 2018

(65) Prior Publication Data
US 2019/0185690 A1 Jun. 20, 2019

(30) Foreign Application Priority Data

Dec. 15, 2017 (JP) .............................. JP2017-240596
Jun. 12, 2018 (JP) .............................. JP2018-111712

(51) Int. Cl.
| | | |
|---|---|---|
| *C09D 11/00* | (2014.01) | |
| *C09D 11/102* | (2014.01) | |
| *C09D 11/322* | (2014.01) | |
| *C09D 11/40* | (2014.01) | |
| *C09D 11/38* | (2014.01) | |
| *C09D 183/12* | (2006.01) | |
| *C09D 1/00* | (2006.01) | |
| *C09D 4/00* | (2006.01) | |
| *C09D 5/00* | (2006.01) | |
| *C09K 3/00* | (2006.01) | |
| *C08L 83/06* | (2006.01) | |
| *C08G 77/46* | (2006.01) | |

(52) U.S. Cl.
CPC .......... *C09D 11/102* (2013.01); *C09D 11/322* (2013.01); *C09D 11/38* (2013.01); *C09D 11/40* (2013.01); *C09D 183/12* (2013.01); *C08G 77/46* (2013.01); *C08L 83/06* (2013.01)

(58) Field of Classification Search
USPC .......... 106/31.01, 31.13, 31.27, 31.57, 31.58
See application file for complete search history.

(56) References Cited

U.S. PATENT DOCUMENTS

| | | | |
|---|---|---|---|
| 7,507,283 B2* | 3/2009 | Akatani ................... | D06P 5/30 106/31.58 |
| 9,789,720 B2 | 10/2017 | Aoai et al. | |
| 2015/0307729 A1 | 10/2015 | Gotou et al. | |
| 2016/0160161 A1 | 6/2016 | Tamai et al. | |
| 2016/0222234 A1 | 8/2016 | Matsuyama et al. | |
| 2016/0257832 A1 | 9/2016 | Teramoto et al. | |
| 2016/0333208 A1 | 11/2016 | Gotou et al. | |
| 2016/0376455 A1 | 12/2016 | Katoh et al. | |

(Continued)

*Primary Examiner* — James E McDonough
(74) *Attorney, Agent, or Firm* — Grüneberg and Myers PLLC

(57) ABSTRACT

An ink includes at least one polyether-modified siloxane compound, and at least one aliphatic alcohol alkylene oxide compound. The mass ratio of the polyether-modified siloxane compound to the aliphatic alcohol alkylene oxide compound in the ink is from 95/5 to 50/50.

12 Claims, 4 Drawing Sheets

(56) References Cited

U.S. PATENT DOCUMENTS

| | | |
|---|---|---|
| 2017/0009092 A1 | 1/2017 | Gotou et al. |
| 2017/0022381 A1 | 1/2017 | Takamura et al. |
| 2017/0107389 A1 | 4/2017 | Umemura et al. |
| 2017/0121543 A1 | 5/2017 | Sakaguchi et al. |
| 2017/0130081 A1 | 5/2017 | Toyama et al. |
| 2017/0182770 A1 | 6/2017 | Gotou |
| 2017/0247556 A1 | 8/2017 | Yokohama et al. |
| 2017/0267888 A1 | 9/2017 | Yokohama et al. |
| 2018/0030292 A1 | 2/2018 | Gotou et al. |
| 2018/0105711 A1 | 4/2018 | Katoh et al. |
| 2018/0126731 A1* | 5/2018 | Ishikawa ............... B41J 2/1433 |
| 2020/0248027 A1* | 8/2020 | Qian ....................... C09D 5/00 |
| 2020/0255649 A1* | 8/2020 | Qian ....................... C08L 83/06 |

* cited by examiner

INK, INK SET, INK CONTAINER, IMAGE FORMING METHOD, IMAGE FORMING APPARATUS AND RECORDED MATTER

CROSS-REFERENCE TO RELATED APPLICATIONS

This patent application is based on and claims priority pursuant to 35 U.S.C. § 119(a) to Japanese Patent Application Nos. 2017-240596 and 2018-111712, filed on Dec. 15, 2017 and Jun. 12, 2018, respectively, in the Japan Patent Office, the entire contents of which are incorporated herein by reference.

BACKGROUND

Technical Field

The present disclosure relates to an ink, an ink set, an ink container, an image forming method, an image forming apparatus, a recorded matter.

Description of the Related Art

Inkjet recording method forms color images easily and its running cost is not expensive. Therefore, the inkjet recording method is widely used. Aqueous pigment ink, in which pigment particulates are dispersed in water, is now appealing to be used in the image forming method. That pigment has a composition similar to the composition of coloring materials for use in typical commercial printing ink. Therefore, texture of printed matter using the pigment is expected to be close to that of commercial printing. However, recording on commercial printing paper or publishing printing coated paper using the aqueous pigment ink causes beading because ink absorption on such paper is slow.

SUMMARY

An improved ink described in this disclosure includes at least one polyether-modified siloxane compound, and at least one aliphatic alcohol alkylene oxide compound, wherein a mass ratio of the polyether-modified siloxane compound to the aliphatic alcohol alkylene oxide compound in the ink is from 95/5 to 50/50.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings.

Figure 1:
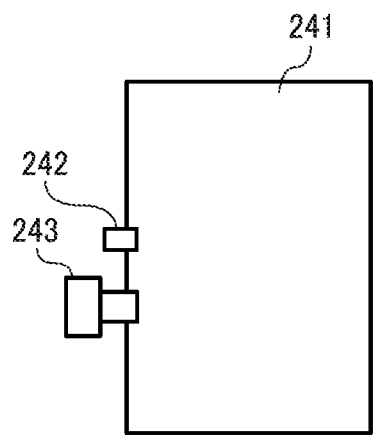
FIG. 1 is a schematic diagram illustrating an example of an ink cartridge.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof are omitted unless otherwise stated.

Objects of the present disclosure are to suppress beading of an image formed with the ink and to improve discharging stability of the ink.

Aspects of the present disclosure are, for example, as follows.

1. An ink contains at least one polyether-modified siloxane compound and at least one aliphatic alcohol alkylene oxide compound, wherein a mass ratio of the polyether-modified siloxane compound to the aliphatic alcohol alkylene oxide compound in the ink is from 95/5 to 50/50.

2. The ink according to 1 mentioned above, wherein the total of the polyether-modified siloxane compound and the aliphatic alcohol alkylene oxide compound has a proportion of from 0.01% by mass to 3.0% by mass relative to the total mass of the ink.

3. The ink according to 1 mentioned above, wherein the polyether-modified siloxane compound is at least compound represented by the following Chemical formula I.

Chemistry formula I

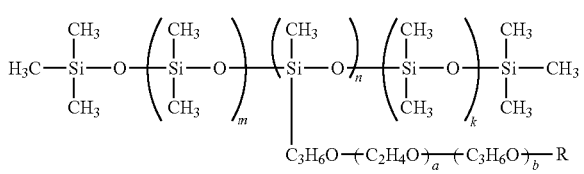

In Chemical formula I, m represents 0 or an integer of from 1 to 23, n represents an integer of from 1 to 10, and k represents 0 or an integer of from 1 to 7, a represents an integer of from 1 to 23, b represents 0 or an integer of from 1 to 23, and R represents a hydrogen atom or an alkyl group having 1 to 4 carbon atoms.

4. The ink according to 3 mentioned above, wherein the compound represented by Chemical formula I is represented by any one of the following Chemical formulae II to V.

Chemical formula II

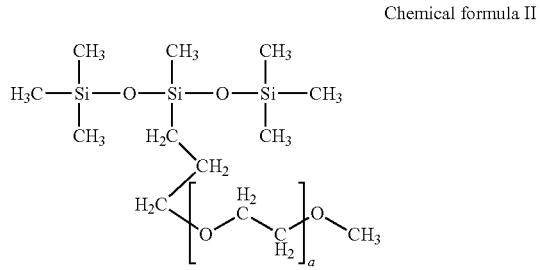

In Chemical formula II, a represents an integer of from 2 to 17.

Chemical formula III

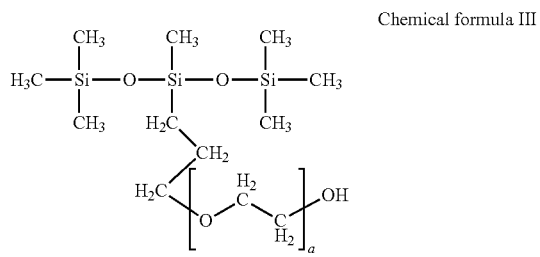

In Chemical formula III, a represents an integer of from 2 to 17.

Chemical formula IV

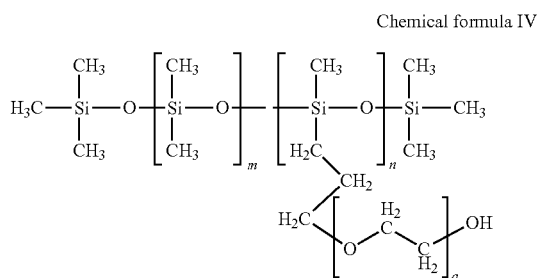

In Chemical formula IV, m represents 0 or an integer of from 1 to 5, n represents an integer of from 1 to 2, and a represents an integer of from 3 to 17.

Chemical formula V

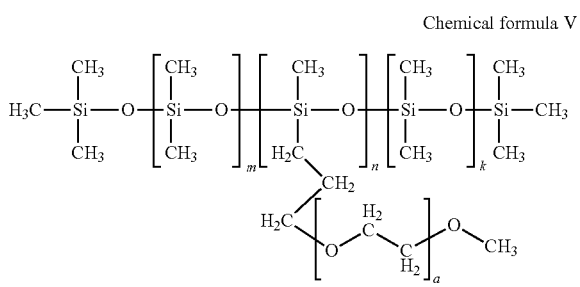

In Chemical formula V, m+k represents 0 or an integer of from 1 to 7, n represents an integer of from 1 to 2, and a represents an integer of from 2 to 16.

5. The ink according to 1 mentioned above, wherein the aliphatic alcohol alkylene oxide compound is at least one compound represented by the following Chemical formula VI or at least one compound represented by the following Chemical formula XII.

Chemical formula VI

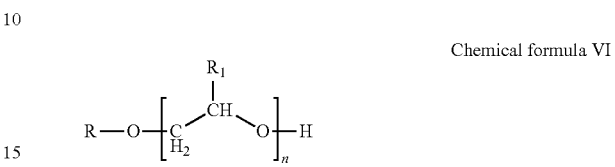

In Chemical formula VI, R represents an alkyl group having 8 to 13 carbon atoms, $R_1$ represents a hydrogen atom or a methyl group, and n represents an integer of from 2 to 12.

Chemical formula VII

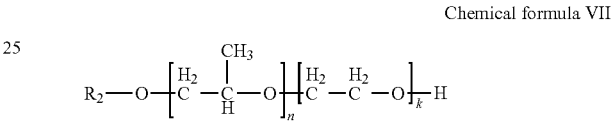

In Chemical formula VII, $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation: $3 \leq n+k \leq 14$.

6. The ink according to 1 mentioned above, wherein the mass ratio of the polyether-modified siloxane compound to the aliphatic alcohol alkylene oxide compound is from 90/15 to 75/30.

7. An ink set includes a yellow ink of 1 mentioned above, a magenta ink of 1 mentioned above, and a cyan ink of 1 mentioned above.

8. The ink set according to 7 mentioned above, further includes a black ink of 1 mentioned above.

9. An ink container includes the ink of 1 mentioned above, and a vessel to accommodate the ink.

10. An image forming method includes applying the ink of 1 mentioned above to a recording medium.

11. An image forming apparatus includes the ink of 1 mentioned above, and an applying device configured to apply the ink to a recording medium.

12. A recorded matter includes a printed layer, wherein the printed layer comprises at least one polyether-modified siloxane compound and at least one aliphatic alcohol alkylene oxide compound, wherein a mass ratio of the polyether-modified siloxane compound to the aliphatic alcohol alkylene oxide compound in the printed layer is from 95/5 to 50/50.

The ink of any one of 1 to 6 mentioned above, the ink set of 7 or 8 mentioned above, the ink container of 9 mentioned above, the image forming method of 10 mentioned above, the image forming apparatus of 11 mentioned above, and the recorded matter of 12 mentioned above provide an ink having good discharging stability to record quality images with reduced beading on general printing paper including plain paper.

In particular, along with improvement on wettability in an inkjet head, no foam is produced during filling the inkjet head with the ink, so that the ink is free of nozzle omission (non-ink discharging at nozzle) ascribable to the foams.

The ink preferably has a dynamic surface tension of 38 mN/m or less and more preferably 35 mN/m at a surface life of 15 msec at 25° C. as measured by maximum bubble pressure technique. When the dynamic surface tension is 38 mN/m or less, coloring property and occurrence of voids on plain paper are improved. When the dynamic surface tension is 35 mN/m or less, wettability and permeation are improved on general printing paper, thereby reducing beading and color bleed.

Dynamic surface tension of the ink at a surface life of 15 msec according to maximum bubble pressure technique can be measured at 25° C. by, for example, SITA_DynoTester (manufactured by SITA Messtechnik GmbH).

The static surface tension of the ink at 25° C. is preferably 22 mN/m or greater and more preferably 24 mN/m or greater. When the static surface tension is 22 mN/m or greater, wetting on the nozzle plate repelling film of an inkjet head can be reduced. Therefore, nozzle omission can be reduced during decapping and continuous discharging. Moreover, when the static surface tension is 24 mN/m or greater, foaming of the ink during initial filling at an inkjet head is reduced, thereby enhancing initial filling property and initial discharging stability. Static surface tension of the ink can be measured at 25° C. by using, for example, a fully-automatic surface tensiometer (CBVP-Z, manufactured by Kyowa Interface Science Co., Ltd.).

Due to the optimal balance between the dynamic surface tension and the static surface tension of the ink, initial filling property is improved, and the ink has excellent discharging stability during decapping and continuous discharging causing no nozzle omission. Moreover, quality images can be obtained on plain paper and general printing paper with the ink.

Ink

The ink of the present disclosure contains at least one polyether-modified siloxane compound, and at least one aliphatic alcohol alkylene oxide compound, wherein a mass ratio of the polyether-modified siloxane compound to the aliphatic alcohol alkylene oxide compound in the ink is from 95/5 to 50/50. The ink can strike a balance between discharging stability and defoaming property. The mass ratio can prevent ejection defects when an image occupying a large area is continuously printed.

In addition, due to the inclusion of at least one polyether-modified siloxane compound and at least one aliphatic alcohol alkylene oxide compound, wettability of the ink on recording medium is sufficiently secured. Moreover, the ink can quickly permeate paper having a coated layer with poor ink absorption property such as general printing paper and thicken due to rapid pigment agglomeration in drying process after the ink lands on the paper, thereby reducing beading.

When the mass ratio of the polyether-modified siloxane compound to the aliphatic alcohol alkylene oxide compound in the ink is from 95/5 to 50/50, beading can be suppressed not only on plain paper but also on general printing paper and ink having good initial filling property (wettability in the liquid chamber and suppression of foaming) and good discharge stability of the inkjet head can be obtained.

In addition to the polyether-modified siloxane compound and the aliphatic alcohol alkylene oxide compound, the ink of the present disclosure can contain an organic solvent, a coloring material, water, and other components.

Surfactant

A polyether-modified siloxane compound can be used as one of the surfactants. In particular, the polyether-modified siloxane compound is preferably at least one compound represented by Chemical formula I.

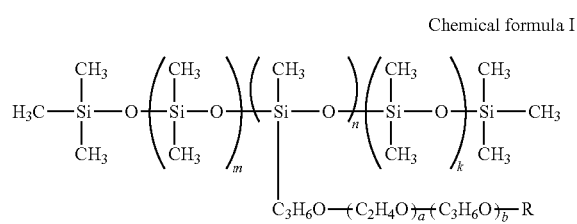

Chemical formula I

In Chemical formula I, m represents 0 or an integer of from 1 to 23, n represents an integer of from 1 to 10, and k represents 0 or an integer of from 1 to 7, a represents an integer of from 1 to 23, b represents 0 or an integer of from 1 to 23, and R represents a hydrogen atom or an alkyl group having 1 to 4 carbon atoms.

The compounds represented by the following Chemical formula II to V are more preferable.

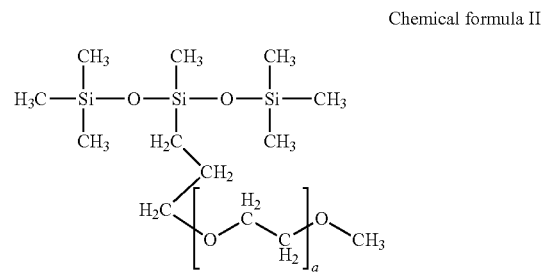

Chemical formula II

In Chemical formula II, a represents an integer of from 2 to 17.

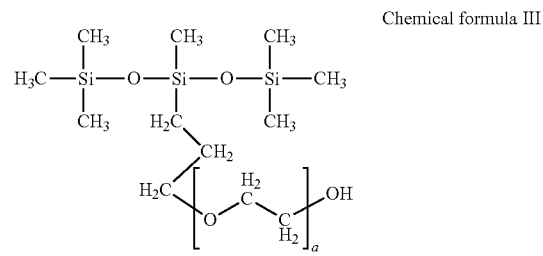

Chemical formula III

In Chemical formula III, a represents an integer of from 2 to 17.

Chemical formula IV

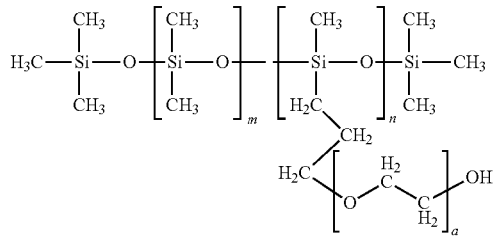

In Chemical formula IV, m represents 0 or an integer of from 1 to 5, n represents an integer of from 1 to 2, and a represents an integer of from 3 to 17.

Chemical formula V

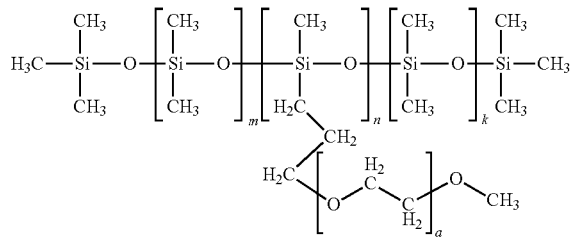

In Chemical formula V, m+k represents 0 or an integer of from 1 to 7, n represents an integer of from 1 to 2, and a represents an integer of from 2 to 16.

Inclusion of the polyether-modified siloxane compound as the surfactant makes ink not easy to be wet on the ink repelling film of the nozzle plate of an ink head. Therefore, defective discharging caused by ink attachment to the nozzle can be prevented so that discharging stability is improved. In addition, quality images can be recorded with reduced beading on general printing paper including plain paper.

The polyether-modified siloxane compound, other than the compound represented by Chemical formula I, is represented by, for example, any one of Chemical formulae VIII to X in terms of keeping dispersion stability, low dynamic surface tension, permeability, and leveling property irrespective of the combination of the kind of coloring material and the organic solvents.

Chemical formula VIII

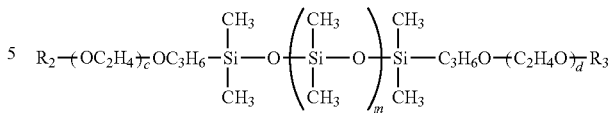

In Chemical formula VIII, m represents an integer of from 1 to 8 and c and d each independently represent integers of from 1 to 10. $R_2$ and $R_3$ each independently represent hydrogen atoms or alkyl groups having 1 to 4 carbon atoms.

Chemical formula IX

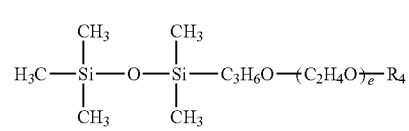

In Chemical formula IX, e represents an integer of from 1 to 8 and $R_4$ represents a hydrogen atom or an alkyl group having 1 to 4 carbon atoms.

Chemical formula X

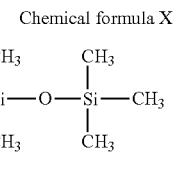

In Chemical formula X, f represents an integer of from 1 to 8. $R_5$ represents a polyether group represented by the following chemical formula XI.

$$-(C_3H_6O)_g-(C_2H_4O)_h-R_6 \quad \text{Chemical formula XI}$$

In Chemical formula XI, g represents 0 or an integer of from 1 to 23 and h represents 0 or an integer of from 1 to 23, excluding the case in which g and h are 0 at the same time. $R_6$ represents a hydrogen atom or an alkyl group having 1 to 4 carbon atoms.

Specific examples of the polyether-modified siloxane compound represented by Chemical formula I include, but are not limited to, the compounds represented by any one of the following Chemical structures XII to XIX.

Chemical structure XII

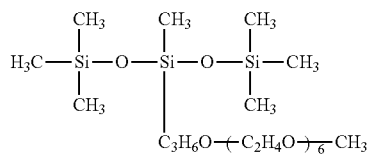

Chemical structure XIII

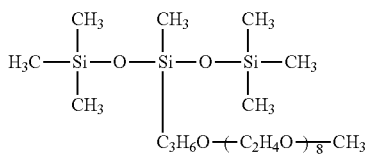

Chemical structure XIV

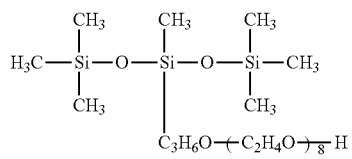

Chemical structure XV

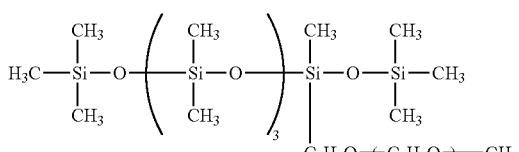

Chemical structure XVI

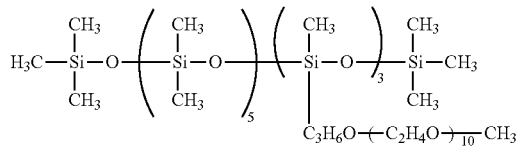

Chemical structure XVII

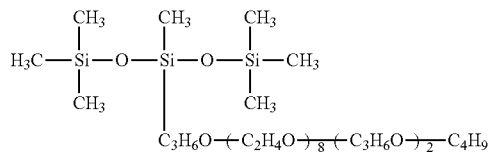

Chemical structure XVIII

Chemical structure XIX

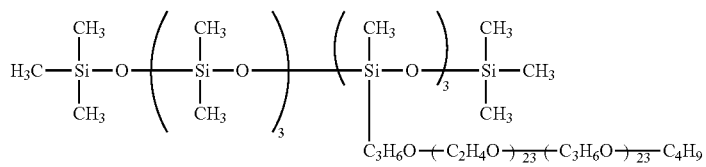

Any suitably synthesized polyether-modified siloxane compound and also products available on the market are usable.

The synthesis method of the polyether-modified siloxane compound has no particular limit and can be suitably selected to suit to the particular application. Examples are described in JP-5101598-B, JP-5032325-B, and JP-5661229-B.

Specifically, the polyether-modified siloxane compound can be obtained by hydrosilylation reaction of (A) polyether and (B) organohydrogen siloxane.

The polyether as the component (A) represents polyoxyalkylene copolymers represented by the formula $-(C_nH_{2n}O)-$, where n represents 2 to 4.

The polyoxyalkylene copolymer unit preferably includes oxyethylene unit $-(C_2H_4O)-$, oxypropylene unit $-(C_3H_6O)-$, oxybutylene unit $-(C_4H_8O)-$, or a mixture unit thereof. The oxyalkylene unit can be disposed in any manner and form a block or random copolymer structure. Of the two copolymer structures, the random copolymer structure is preferable. More preferably, the polyoxyalkylene is a random copolymer that contains both oxyethylene unit $-(C_2H_4O)-$ and oxypropylene unit $-(C_3H_6O)-$.

Organohydrogen siloxane as the component (B) contains organopolysiloxane including at least one hydrogen bonded with silicon (SiH) in one molecule. Examples of the organopolysiloxane are any arbitrary numbers or combinations of $(R_3SiO_{0.5})$, $(R_2SiO)$, $(RSiO_{1.5})$, and $(SiO_2)$, where R independently represents an organic group or a hydrocarbon group.

When R in $(R_3SiO_{0.5})$, $(R_2SiO)$, and $(RSiO_{1.5})$ of the organopolysiloxane is a methyl group, the siloxy unit is represented as M, D, and T unit. $(SiO_2)$ siloxy unit is represented as Q unit.

The organohydrogen siloxane has a similar structure and at least one SiH present on the siloxy unit.

The methyl-based siloxy unit in the organohydrogen siloxane includes "$M^H$" siloxy unit $(R_2HSiO_{0.5})$, "$D^H$" siloxy unit (RHSiO), and "$T^H$" siloxy unit $(HSiO_{1.5})$.

The organohydrogen siloxane may include any number of M, $M^H$, D, $D^H$, T, $T^H$, or Q siloxy unit as long as at least one siloxy unit includes SiH.

The component (A) and the component (B) react in a hydrosilylation reaction. There is no specific limitation to the hydrosilylation reaction and it can be suitably selected to suit to a particular application. Addition of a hydrosilylation catalyst is preferable to conduct the hydrosilylation reaction.

There is no specific limitation to the hydrosilylation catalyst, which can be suitably selected to suit to a particular application. Specific examples include, but are not limited to, platinum, rhodium, ruthenium, palladium, osmium, or iridium metal, an organic metal compound thereof, and any combination thereof.

The content of the hydrosilylation catalyst is preferably from 0.1 to 1,000 ppm and more preferably from 1 to 100 ppm based on the mass of the component (A) and the component (B).

The hydrosilylation reaction can be conducted without dilution or in the presence of a solvent. It is preferable in the presence of a solvent.

Specific examples of the solvent include, but are not limited to, alcohols (for example, methanol, ethanol, isopropanol, butanol, and n-propanol), ketones (for example, acetone, methylethyl ketone, and methyl isobutyl ketone), aromatic hydrocarbons (for example, benzene, toluene, and xylene), aliphatic hydrocarbons (for example, heptane, hexane, and octane), glycol ethers (for example, propylene glycol methylether, dipropylene glycol methylether, propylene glycol n-propylether, and ethylene glycol n-butylether), halogenized hydrocarbon (for example, dichloromethane, 1,1,1-trichloroethane, methylene chloride, and chloroform), dimethylsulfoxide, dimethyl formamide, acetonitrile, tetrahydrofuran, benzine, mineral spirit, and naphtha. These solvents can be used alone or in combination.

The content of the component (A) and the component (B) for use in the hydrosilylation reaction has no particular limit and can be adjusted to suit to a particular application. The ratio of the content of all of the unsaturated groups in the component (A) to the content of the SiH in the component (B) is expressed on a molar basis. The number of moles of the polyether unsaturated group to the number of moles of SiH in the organohydrogen siloxane is preferably 20% or less, more preferably 10% or less.

There is no specific limitation to the hydosilylation reaction and it can be conducted by any known batch method, semi-continuation method, or continuation method. For example, it is possible to conduct the reaction using a plug flow reactor.

Specific examples of polyether-modified siloxane compounds available on the market include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191, all manufactured by Dow Corning Toray Co., Ltd., TSF4440, TSF4441, TSF4445, TSF4446, TSF4450, TSF4452, and TSF4460, all manufactured by Momentive Performance Materials Inc., SILFACE SAG002, SILFACE SAG003, SILFACE SAG005, SILFACE SAG503A, SILFACE SAG008, and SILFACE SJM003, all manufactured by Nisshin Chemical Co., Ltd., TEGO Wet KL245, TEGO Wet 250, TEGO Wet 260, TEGO Wet 265. TEGO Wet 270, and TEGO Wet 280, all manufactured by Evonik Industries AG, and BYK-345, BYK-347, BYK-348, BYK-375, and BYK-377, all manufactured by BYK Japan KK. These polyether-modified siloxane compounds can be used alone or in combination.

Of these, TEGO Wet 270 (manufactured by Evonik Industries AG) and SILFACE SAG503A (manufactured by Nisshin Chemical Co., Ltd.) are preferable.

The other surfactant is preferably an aliphatic alcohol alkylene oxide compound, which is a compound represented by the following Chemical formula VI or a compound represented by the following Chemical formula VII.

Chemical formula VI

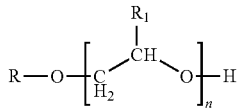

In Chemical formula VI, R represents an alkyl group having 8 to 13 carbon atoms, $R_1$ represents a hydrogen atom or a methyl group, and n represents an integer of from 2 to 12, Chemical formula VII

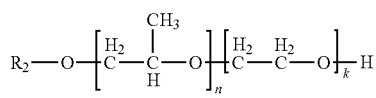

In Chemical formula VII, $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation: $3 \leq n+k \leq 14$.

The inclusion of an aliphatic alcohol alkylene oxide compound as the surfactant makes the ink not easy to be wet on the ink repelling film of the nozzle plate of an ink head. Therefore, defective discharging caused by ink attachment to the nozzle can be prevented so that discharging stability is improved. Moreover, initial ink filling in the inkjet head is enhanced, thereby providing ideal ink having good discharging stability at the time of initial ink filling.

Specific examples of the aliphatic alcohol alkylene oxide compound represented by Chemical formula VI available on the market include, but are not limited to, Newcol NT-3, Newcol NT-5, and Newcol 1310 (manufactured by Nippon Nyukazai Co., Ltd.), and NOIGEN XL-40, NOIGEN XL-41, NOIGEN XL-50, NOIGEN LF-40X, NOIGEN LF-41X, NOIGEN LF-42X, NOIGEN LF-60X, NOIGEN TDS-50, NOIGEN TDS-70, NOIGEN TDX-50, NOIGEN SD-30, DKS NL-30, DKS NL-40, NOIGEN ET-65, DKS NL-Dash403, DKS NL-Dash404, NOIGEN LP-55, NOIGEN ET-106A, NOIGEN ET-69, and NOIGEN ET-89 (all manufactured by DKS Co. Ltd.).

Next, the aliphatic alcohol alkylene oxide compound represented by Chemical formula VII is described. Synthesis Examples of the compound represented by Chemical formula VII are as follows.

Synthesis Example 1

Synthesis of Adduct (A-1) of 2-ethyl-1-hexanol with 4 mols of EO 130 parts by mass (1 mol) of 2-ethyl-1-hexanol and 1 part by mass (0.002 mol) of perchloric acid aluminum nonahydrate are loaded in a pressure tight reaction container equipped with a stirrer, heating-cooling equipment, and a dripping bomb. Subsequent to nitrogen replacement, the pressure tight reaction container is sealed, heated to 70 degrees C., and dehydrated with a reduced pressure for one hour. The system is heated to 80 degrees C. 88 parts by mass (2 mols) of ethylene oxide (EO) is dripped to the reaction container in 10 hours in such a manner that the pressure is adjusted to keep not greater than 0.2 MPaG, followed by aging at 95° C. for five hours. After being cooing down to 70° C., 10 parts by mass of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (a-1) of 2-ethyl-1-hexanol with 2 mols of EO. 0.1 parts by mass of potassium hydroxide is added to the thus-obtained (a-1) and the system is heated to 70° C. followed by dehydration with a reduced pressure for one hour. The system is heated to 140° C. 88 parts by mass (2 mols) of ethylene oxide (EO) is dripped to the reaction container in 3 hours in such a manner that the pressure is kept not greater than 0.5 MPaG, followed by aging at 140° C. for two hours.

After being cooing down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (A-1) of 2-ethyl-1-hexanol with 4 mols of EO.

(A-1) is represented by Chemical formula VII in which $R_2$ is 2-ethyl-1-hexyl group and the number of alkylene oxide m (=the number of the propylene oxide and ethylene oxide) is 4.

The amount of non-reacted alcohol is measured using a gas chromatography under the following condition.

Type of device: Gas Chromatography GC-14B, manufactured by Shimadzu Corporation

Detector: FID column: glass column (inner diameter=about 3 mm, length=about 2 m)

Column filling agent: silicon GE SE-30 5%

Column temperature: heat from 90 to 280° C.

Heating speed: 4° C./min

Carrier gas: nitrogen
Sample: 50% acetone solution
Infusing amount: 1 μl
Quantification: alcohol having two or three less carbon atoms than the alcohol used as inner reference material for quantification

Synthesis Example 2

Synthesis of Adduct (A-2) of 2-ethyl-1-hexanol with 6 mols of EO 130 parts (1 mol) of 2-ethyl-1-hexanol and 1 part (0.002 mols) of perchloric acid aluminum nonahydrate are charged in a pressure tight reaction container equipped with a stirrer, heating-cooling equipment, and a dripping bomb. Thereafter, the pressure tight reaction container is heated to 70° C., and dehydrated under a reduced pressure for one hour. The system is heated to 80° C. 88 parts (2 mols) of ethylene oxide (EO) is dripped to the reaction container in 10 hours in such a manner that the pressure is adjusted to keep not greater than 0.2 MPaG, followed by aging at 95° C. for five hours. After being cooing down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (a-2) of 2-ethyl-1-hexanol with 2 mols of EO. 0.2 parts of potassium hydroxide is added to the thus-obtained (a-2). Subsequent to nitrogen replacement, the system is sealed and heated to 70° C. followed by dehydration under a reduced pressure for one hour. The system is heated to 140° C. 176 parts (4 mols) of ethylene oxide (EO) is dripped to the reaction container in 5 hours in such a manner that the pressure is adjusted to keep not greater than 0.5 MPaG followed by aging at 140° C. for two hours. After being cooling down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (A-2) of 2-ethyl-1-hexanol with 6 mols of EO.

(A-2) is represented by Chemical formula VII in which $R_2$ is 2-ethyl-1-hexyl group and the number of alkylene oxide m (=the number of the propylene oxide and ethylene oxide) is 6.

Synthesis Example 3

Synthesis of Adduct (A-3) of 3,5,5-trimethyl-1-hexanol with 4 mols of EO

An adduct (A-3) of 3,5,5-trimethyl-1-hexanol with 4 mols of EO is obtained in the same manner as in Synthesis Example 1 except that 130 parts (1 mol) of 2-ethyl-1-hexanol is changed to 144 parts (1 mol) of 3,5,5-trimethyl-1-hexanol.

(A-3) is represented by Chemical formula VII in which $R_2$ is 3,5,5-trimethyl-1-hexanol group and the number of alkylene oxide m (=the number of the propylene oxide and ethylene oxide) is 4.

Synthesis Example 4

Synthesis of Adduct (A-4) of 3,5,5-trimethyl-1-hexanol with 6 mols of EO

An adduct (A-4) of 3,5,5-trimethyl-1-hexanol with 6 mols of EO is obtained in the same manner as in Synthesis Example 2 except that 130 parts (1 mol) of 2-ethyl-1-hexanol is changed to 144 parts (1 mol) of 3,5,5-trimethyl-1-hexanol.

(A-4) is represented by Chemical formula VII in which $R_2$ is 3,5,5-trimethyl-1-hexanol group and the number of alkylene oxide m (=the number of the propylene oxide and ethylene oxide) is 6.

Synthesis Example 5

Synthesis of Adduct (A-5) of Decanol with 5 mols of EO

An adduct (A-5) of decanol with 5 mols of EO is obtained in the same manner as in Synthesis Example 2 except that 130 parts (1 mol) of 2-ethyl-1-hexanol is changed to 158 parts (1 mol) (manufactured by KH Neochem Co., Ltd.) and 176 parts of EO is changed to 132 parts (3 mols).

(A-5) is represented by Chemical formula VII in which $R_2$ is decyl group and the number of alkylene oxide m (=the number of the propylene oxide and ethylene oxide) is 5.

Synthesis Example 6

Synthesis of Random Adduct (A-6) of Decanol with 2 mols of EO (EO 5 mol/PO 1 mol)

158 parts (1 mol) of decanol and 1 part (0.004 mols) of perchloric acid magnesium nonahydrate are charged in a pressure tight reaction container equipped with a stirrer, heating-cooling equipment, and a dripping bomb. Thereafter, the pressure tight reaction container is heated to 80° C., and dehydrated under a reduced pressure for one hour. The system is heated to 95° C. 88 parts (2 mols) of ethylene oxide (EO) is dripped to the reaction container in 10 hours in such a manner that the pressure is adjusted to keep not greater than 0.2 MPaG followed by aging at 95° C. for five hours. After being cooing down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (a-6) of decanol with 2 mols of EO. 0.5 parts of potassium hydroxide is added to the thus-obtained (a-6) and the system is heated to 95° C. followed by dehydration under a reduced pressure for one hour. The system is heated to 140° C. A mixture of 220 parts (5 mols) and 58 parts (1 mol) of propylene oxide (PO) is dripped to the reaction container in 5 hours in such a manner that the pressure is adjusted to keep not greater than 0.5 MPaG, followed by aging at 140° C. for two hours. After being cooing down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain a random adduct (A-6) of decanol with 2 mols of EO (EO 5 mol/PO 1 mol).

(A-6) is represented by Chemical formula VII in which $R_2$ is decyl group and the number of alkylene oxide m (=the number of the propylene oxide and ethylene oxide) is 8.

Synthesis Example 7

Synthesis of Adduct (A-7) of 1-Nonanol with 6 mols of EO

An adduct (A-7) of decanol with 6 mols of EO is obtained in the same manner as in Synthesis Example 2 except that 130 parts (1 mol) of 2-ethyl-1-hexanol is changed to 144 parts (1 mol) of 1-nonanol.

(A-7) is represented by Chemical formula VII in which $R_2$ is n-nonyl group and the number of alkylene oxide m (=the number of the propylene oxide and ethylene oxide) is 6.

Synthesis Example 8

Synthesis of Adduct (A-8) of 3,5,5-trimethyl-1-hexanol with 4 mols of PO 144 parts (1 mol) of 3,5,5-trimethyl-1-hexanol and 0.5 parts (0.009 mols) of potassium hydroxide are loaded in a pressure tight reaction container equipped with a stirrer, heating-cooling equipment, and a dripping bomb. Subsequent to nitrogen replacement, the pressure tight reaction container is sealed, heated to 70° C., and dehydrated under a reduced pressure for one hour.

The system is heated to 130° C. 232 parts (4 mols) of propylene oxide (PO) is dripped to the reaction container in 10 hours in such a manner that the pressure is adjusted to keep not greater than 0.2 MPaG followed by aging at 140° C. for five hours. After being cooing down to 70° C., 10 parts of an adsorption treatment agent (Kyoward 600, manufactured by Kyowa Chemical Industry Co., Ltd.) is loaded in the reaction container. Subsequent to one-hour stirring at 70° C., the adsorption treatment agent is filtrated to obtain an adduct (A-1) of 3,5-5-trimethyl-1-hexanol with 4 mols of PO.

(A-8) is represented by Chemical formula VII in which $R_2$ is 3,5,5-trimethyl-1-hexanol group and the number of alkylene oxide m (=the number of the propylene oxide and ethylene oxide) is 4.

Synthesis Example 9

Synthesis of Adduct (A-9) of 3,5,5-trimethyl-1-hexanol with 3 mols of PO and 2 mols of EO 144 parts (1 mol) of 3,5,5-trimethyl-1-hexanol and 0.5 parts (0.009 mols) of potassium hydroxide are loaded in a pressure tight reaction container equipped with a stirrer, heating-cooling equipment, and a dripping bomb. Subsequent to nitrogen replacement, the pressure tight reaction container is sealed, heated to 70° C., and dehydrated under a reduced pressure for one hour.

The system is heated to 130° C. 174 parts (3 mols) of propylene oxide (PO) is dripped to the reaction container in 9 hours in such a manner that the pressure is adjusted to keep not greater than 0.2 MPaG followed by aging at 140° C. for five hours. Thereafter, 88 parts (2 mols) of ethylene oxide (EO) is dripped to the reaction container in 5 hours in such a manner that the pressure is adjusted to keep not greater than 0.5 MPaG followed by aging at 140° C. for two hours. After being cooing down to 70° C., 10 parts of an adsorption treatment agent (Kyoward 600, manufactured by Kyowa Chemical Industry Co., Ltd.) is loaded in the reaction container followed by one-hour stirring at 70° C. Thereafter, the adsorption treatment agent is filtrated to obtain an adduct (A-9) of 3,5,5-trimethyl-1-hexanol with 3 mols of PO and 2 mols of EO.

(A-9) is represented by Chemical formula VII in which $R_2$ is 3,5,5-trimethyl-1-hexanol group and the number of alkylene oxide m (=the number of the propylene oxide and ethylene oxide) is 5.

In the present disclosure, the ratio of the polyether-modified siloxane compound to the aliphatic alcohol alkylene oxide compound as the surfactants is preferably from 95/5 to 50/50, more preferably from 90/10 to 65/35, and furthermore preferably from 90/15 to 75/30.

Within the range of from 95/5 to 50/50, quality images can be recorded with reduced beading on general printing paper including plain paper. Also, the ink has good initial filling property (wettability in liquid chamber and reduction of producing foaming) of an inkjet head and contributes to good discharging stability.

In addition to the polyether-modified siloxane compound and the aliphatic alcohol alkylene oxide compound, fluorochemical surfactants, silicone-based surfactants, acetylene glycol-based or acetylene alcohol-based surfactants can be used in combination.

The total proportion of the polyether-modified siloxane compound and the aliphatic alcohol alkylene oxide compound relative to the entire ink is preferably from 0.01 to 3.0 percent by mass, more preferably from 0.1 to 1.5 percent by mass, and furthermore preferably from 0.5 to 1.4 percent by mass. When the proportion is from 0.01 to 3.0 percent by mass, ink is not easily wet on the ink repelling film of the nozzle plate of an ink head. Therefore, defective discharging caused by ink attachment to the nozzle plate can be prevented and discharging stability is improved. In particular, when continuous ejection time is long, such as continuously forming an image with a large area to be filled, the proportion of from 0.01 to 3.0 percent by mass improves ejection stability.

Organic Solvent

It is preferable to contain one or more organic solvents having a solubility parameter of from 8.96 to 11.79. Inclusion of the organic solvent having a solubility parameter of from 8.96 to 11.79 makes it possible to reduce occurrence of beading on general printing paper.

The solubility parameter (SP value) is a value indicating how easily two materials are mutually dissolved in each other. The SP value is represented by an attractive intermolecular force, that is, a square root of cohesive energy density (CED). CED is an amount of energy required to evaporate 1 mL of an article.

The solubility parameter (SP value) is defined by the regular solution theory introduced by Hildebrand and indicates the solubility of a two-component system solution.

There are theories about the calculation method of SP value. In the present disclosure, a generally-used Fedors method is used.

According to the Fedors method, the SP value can be calculated using the following relation B.

$$\text{SP value(solubility parameter)} = (\text{CED value})^{1/2} = (E/V)^{1/2} \qquad \text{Relation B}$$

In Relation B, E represents molecule cohesive energy (cal/mol) and V represents molecular volume (cm³/mol). Also, E and V are calculated by the following relation C and relation D, respectively, where Δei represents evaporation energy of atomic group and Δvi represents mole volume.

$$E = \Sigma \Delta ei \qquad \text{Relation C}$$

$$V = \Sigma \Delta vi \qquad \text{Relation D}$$

As the calculation method and the data of evaporation energy Δei and the mol volume Δvi of individual atomic groups, the data shown in Imoto, Minoru, *Basic Theory of Attachment*, chapter five, published by "KOUBUNSHI KAGAKUKAI" can be used.

Data of —$CF_3$ group, etc. that are not disclosed in *Basic Theory of Attachment* are obtained from R. F. Fedors, Polymer Eng. Sci. 14, 147 (1974).

As the organic solvent having a solubility parameter (SP value) of from 8.96 to 11.79, at least one member selected from the group consisting of an amide compound represented by the following Chemical formula XX and an oxetane compound represented by the following Chemical formula XXI is more preferable.

Chemical Formula XX

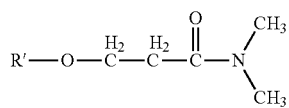

In Chemical formula XX, R' represents an alkyl group having 4 to 6 carbon atoms.

Chemical formula XXI

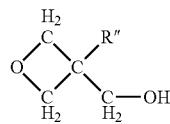

In Chemical formula XXI, R" represents an alkyl group having one or two carbon atoms.

Specific examples of the amide compound represented by Chemical formula XX include, but are not limited to, the following compounds represented by Chemical structures I to III.

Specific examples of the oxetane compound represented by Chemical formula XXI illustrated above include, but are not limited to, the following compounds represented by Chemical structures IV and V.

Chemical structure I

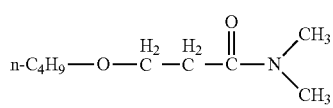

SP value: 9.03

Chemical structure II

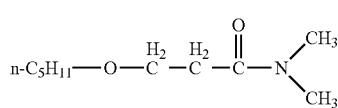

SP value: 9.00

Chemical structure III

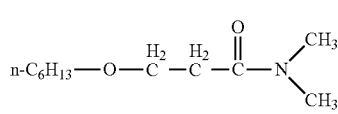

SP value: 8.96

Chemical structure IV

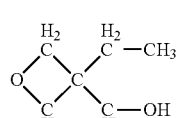

SP value: 11.3

Chemical structure V

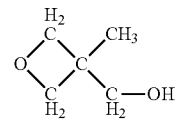

AP value: 11.79

As the organic solvents, in addition to the amide compound represented by the Chemical formula XX and the oxetane compound represented by the Chemical formula XXI, it is preferable to use polyhydric alcohols and permeating agents having a solubility parameter (SP value) of from 11.8 to 14.0.

Specific examples of the polyhydric alcohols having a solubility parameter (SP value) of from 11.8 to 14.0 include, but are not limited to, 3-methyl-1,3-butanediol (SP value: 12.05), 1,2-butane diol (SP value: 12.8), 1,3-butane diol (SP value: 12.75), 1,4-butane diol (SP value: 12.95), 2,3-butane diol (SP value: 12.55), 1,2-propane diol (SP value: 13.5), 1,3-propane diol (SP value: 13.72), 1,2-hexane diol (SP value: 11.8), 1,6-hexanendiol (SP value: 11.95), 3-methyl-1,5-pentanediol (SP value: 11.8), triethylene glycol (SP value: 12.12), and diethylenen glycol (SP value: 13.02). These polyhydric alcohols can be used alone or in combination.

Of these polyhydric alcohols, 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), 1,3-propanediol (SP value: 13.72) are preferable. 1,2-butanediol (SP value: 12.8) and 1,2-propanediol (SP value: 13.5) are more preferable.

The total of the polyhydric alcohol (polyol) having an solubility parameter (SP value) of from 11.8 to 14.0, the amide compound represented by the Chemical formula XX, and the oxetane compound represented by Chemical formula XXI preferably accounts for 30 to 60 percent by mass of the total content of ink.

When the content is 30 percent by mass or greater, beading on general printing paper and color bleed between colors can be reduced. When the content is 60 percent by mass or less, good image quality and suitable ink viscosity can be achieved, thereby achieving preferable discharging stability.

As the permeating agent, the solubility parameter is preferably from 8.96 to 11.79. For example, polyol compounds and glycol ether compounds having 8 to 11 carbon atoms are suitable.

Of these permeating agents, 1,3-diol compounds represented by Chemical formula XXII are preferable.

Specific examples include, but are not limited to, 2-ethyl-1,3-hexane diol (SP Value: 10.6), 2,2,4-trimethyl-1,3-pentane diol (SP Value: 10.8), 2-ethyl-2-methyl-1,3-propane diol (SP Value: 11.65), 3,3-dimethyl-1,2-butane diol (SP Value: 11.49), 2,2-diethyl-1,3-propane diol (SP Value: 11.34), 2-methyl-2-propyl-1,3-propane diol (SP Value: 11.34), 2,4-dimethyl-2,4-pentanediol (SP Value: 11.05), 2,5-dimethyl-2,5-hexane diol (SP Value: 10.82), and 5-hexene-1,2-diol (SP Value: 11.80). Of these permeating agent, 2-ethyl-1,3-hexane diol (SP Value: 10.6) and 2,2,4-trimethyl-1,3-pentane diol (SP Value: 10.8) are particularly preferable.

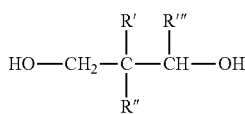

Chemical XXII

In Chemical formula XXII, R' represents a methyl group or an ethyl group, R" represents a hydrogen or a methyl group, and R'" represents an ethyl group or a propyl group.

Specific examples of the other polyol compound include, but are not limited to, 2-ethyl-2-methyl-1,3-propanediol, 3,3-dimethyl-1,2-butane diol, 2,2-diethyl-1,3-propane diol, 2-methyl-2-propyl-1,3-propane diol, 2,4-dimethyl-2,4-pentane diol, 2,5-dimethyl-2,5-hexane diol, and 5-hexene-1,2-diol.

The proportion of the permeating agent to the entire ink is preferably from 0.5 to 4 percent by mass and more preferably from 1 to 3 percent by mass. When the proportion is not less than 0.5 percent by mass, ink suitably permeates a medium so as to achieve good image quality. When the content is 4 percent by mass or less, suitable initial viscosity of ink can be obtained.

The proportion of the organic solvent having a solubility parameter of from 8.96 to 11.79 to the entire ink is preferably 20 percent by mass or greater and more preferably from 20 to 60 percent by mass.

When the proportion is 20 percent by mass or more, beading on general printing paper is sufficiently reduced, thereby enhancing reduction effect on occurrence of color bleed between colors. When the proportion is not greater than 60 percent by mass, image quality is improved and ink viscosity becomes suitable, thereby stabilizing discharging.

The organic solvent preferably contains no polyhydric alcohol having an equilibrium moisture content of 30 percent or more at 23° C. and a relative humidity of 80 percent.

To obtain the equilibrium moisture content, a petri dish is preserved on which one gram of each organic solvent is placed in a desiccator in which the temperature and the relative humidity are respectively maintained at 22 to 24° C. and 77 to 83 percent, using a saturated aqueous solution of potassium chloride and sodium chloride. The equilibrium moisture content is calculated utilizing the following relation:

Equilibrium moisture content(percent)=[moisture content absorbed in organic solvent/(amount of organic solvent+moisture content absorbed in organic solvent)]×100

If the organic solvent contains no polyhydric alcohol having an equilibrium moisture content of 30 percent or more at 23° C. and an RH of 80 percent, ink easily permeate coated paper having a coated layer with poor ink absorption property such as general printing paper so that the ink easily dries after the ink lands on the paper, which may suppress beading.

Such a polyhydric alcohol having an equilibrium moisture content of 30 percent or more at 23° C. and an RH of 80 percent is used in, for example, JP-2012-207202-A and JP-2014-94998-A.

Specific examples include, but are not limited to, 1,2,3-butanetriol (equilibrium moisture content: 38 percent), 1,2,4-butanetriol (equilibrium moisture content: 41 percent), glycerin (equilibrium moisture content: 49 percent, SP value: 16.38). diglycerin (equilibrium moisture content: 38 percent), triethylene glycol (equilibrium moisture content: 39 percent, SP value: 15.4), tetraethylene glycol (equilibrium moisture content: 37 percent), diethylene glycol (equilibrium moisture content: 43 percent), and 1,3-butane diol (equilibrium moisture content: 35 percent).

Coloring Material

It is preferable to use a water-dispersible pigment as the coloring material. Dyes can be used in combination for color tone adjustment. However, the dyes should be used within a range having no adverse impact on weather resistance.

The pigments in the water-dispersible pigment can be organic pigments and inorganic pigments.

Specific examples of the inorganic pigments include, but are not limited to, titanium oxide, iron oxide, calcium oxide, barium sulfate, aluminum hydroxide, barium yellow, cadmium red, chrome yellow, and carbon black. Of these inorganic pigments, carbon black is preferable.

Carbon black (Pigment Black 7) can be manufactured by a known method such as a contact method, a furnace method, and a thermal method. Specific examples include, but are not limited to, channel black, furnace black, gas black, and lamp black.

Examples of carbon black available on the market are Black Pearls®, Elftex®, Monarch®, Regal®, Mogul®, and Vulcan®. Specific examples include, but are not limited to, Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Regal 400, Regal 660, and Vulcan P (all available from Cabot Corporation), SENSIJET Black SDP 100 (available form SENSIENT), SENSIJET Black SDP 1000 (available from SENSIENT), and SENSIJET Black SDP 2000 (available from SENSIENT). These examples can be used alone or in combination.

Specific examples of the organic pigments include, but are not limited to, azo pigments, polycyclic pigments, dye chelate, nitro pigments, nitroso pigments, and aniline black. Of these organic pigments, azo pigments and polycyclic pigments are preferable.

Specific examples of the azo pigments include, but are not limited to, azo lake, insoluble azo pigments, condensation azo pigments, and chelate azo pigments. Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, and quinofuranone pigments. The dye chelate includes, but is not limited to, basic dye type chelate, and acidic dye type chelate.

Specific examples of the organic pigment include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 153, 155, 180, 183, 185 and 213: C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3 (Phthalocyanine Blue), 16, 17:1, 56, 60, and 63; and C.I. Pigment Green 1, 4, 7, 8, 10, 17, 18, and 36. These examples can be used alone or in combination.

The specific surface area of the pigment has no particular limit and can be selected to suit to a particular application. For example, the specific surface area is preferably from 10 to 1,500 m²/g, more preferably from 20 to 600 m²/g, and furthermore preferably from 50 to 300 m²/g.

Unless a pigment having such a suitable surface area is available, it is possible to reduce the size of the pigment or pulverize it by using, for example, a ball mill, a jet mill, or ultrasonic wave for the pigment to obtain a relatively small particle diameter.

The volume particle diameter ($D_{50}$) of the pigment is preferably from 10 to 200 nm.

As the water-dispersible pigment, for example, (1) a surfactant dispersion pigment in which a pigment is dispersed by a surfactant, (2) a resin dispersion pigment in which a pigment is dispersed by a resin, (3) a resin coated dispersion pigment in which the surface of a pigment is covered with a resin, and (4) a self-dispersible pigment in which a hydrophilic group is provided to the surface of a pigment are suitable.

Of these water-dispersible pigments, in terms of storage stability over time and reduction of viscosity increase at the time of water evaporation, the resin coated dispersion pigment in which the surface of a pigment is covered with a resin, and the self-dispersible pigment in which a hydrophilic group is provided to the surface of a pigment are preferable.

As the self-dispersible pigment in which a hydrophilic group is provided to the surface of a pigment, anionic-charged self-dispersible pigments are preferable.

Specific examples of the anionic functional groups include, but are not limited to, —COOM, —SO₃M, —PO₃HM, —PO₃M₂, —CONM₂, —SO₃NM₂, —NH—C₆H₄—COOM, —NH—C₆H₄—SO₃M, —NH—C₆H₄—PO₃HM, —NH—C₆H₄—PO₃M₂, —NH—C₆H₄—CONM₂, and —NH—C₆H₄—SO₃NM₂. Examples of the counter ion M are alkali metal ions and quaternary ammonium ion. Of these counter ions, quaternary ammonium ion is preferable.

Specific examples of the quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion. Of these quaternary ammonium ions, tetraethyl ammonium ion, tetrabutyl ammonium ion, and benzyl trimethyl ammonium ion are preferable. Of these quaternary ammonium ions, tetrabutyl ammonium ion is preferable.

If a self-dispersible pigment having the hydrophilic functional group or the quaternary ammonium ion is used, affinity is demonstrated in both water rich ink or organic solvent rich ink, so that dispersion stability of pigment can be maintained.

Of these self-dispersible pigments, since ink that uses a pigment modified by at least one of geminalbis phosphonic acid group and geminalbis phosphonic acid salt group has an excellent re-dispersibility after being dried, clogging does not occur even when the ink moisture around the inkjet head nozzles evaporates while the printing device is not operated for a long time. Therefore, good quality printing can be maintained by a simple cleaning operation.

Moreover, since such ink has good storage stability over time and can restrain viscosity increase during moisture evaporation, ink fixability and discharging reliability at a head maintaining device are extremely excellent.

Specific examples of phosphonic acid group and phosphonic acid salt group are represented by the following Chemical stricture i to Chemical structure iv.

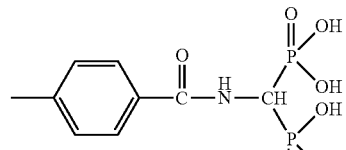

Chemical structure i

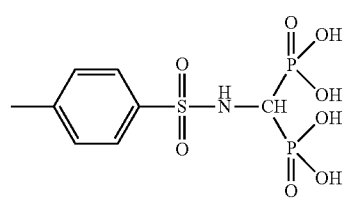

Chemical structure ii

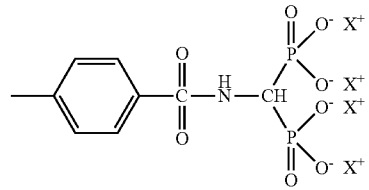

Chemical structure iii

In Chemical structure iii, $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

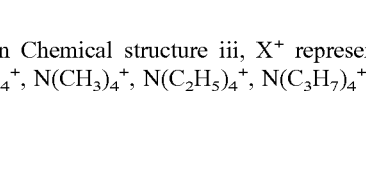

Chemical structure iv

In Chemical structure iv, $X^+$ represents $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

Reforming Treatment of Surface of Pigment

Reforming treatment of the surface of a pigment is described by taking a case of geminalbis phosphonic acid group as an example. For example, the pigment can be reformed by the following method A or method B.

Method A 20 g of carbon black, 20 mmol of the compound represented by Chemical structure v or Chemical structure vi illustrated below, and 200 mL of deionized water are mixed at room temperature by a Silverson Mixer (6,000 rpm). When the obtained slurry has a pH greater than 4, 20 mmol of nitric acid is added. 30 minutes later, 20 mmol of sodium nitrite dissolved in a minute amount of deionized highly pure water is slowly added to the mixture. Furthermore, when the resultant is stirred and heated to 60° C. to react for one hour, a reformed pigment is obtained in which the compound represented by Chemical structure v or Chemical structure vi is added to carbon black. Thereafter, pH of the reformed pigment is adjusted to be 10 by NaOH aqueous solution. As a result, a reformed pigment dispersion is obtained 30 minutes later. Thereafter, subsequent to ultrafiltration by dialysis membrane using the reformed pigment dispersion and deionized water, the resultant is subject to ultrasonic wave dispersion to obtain a reformed pigment dispersion in which the solid portion is condensed.

Method B 500 g of dried carbon black, 1 L of water, and one mol of the compound represented by Chemical structure v or Chemical structure vi are loaded in a mixer (4 L) (ProcessAll 4HV). Next, the mixture is vigorously mixed at 300 rpm for 10 minutes while keeping the system at 60° C. Thereafter, 20 percent sodium nitrite aqueous solution (1 mol equivalent to the compound represented by chemical structure v or Chemical structure vi is added in 15 minutes followed by mixing and stirring for three hours while keeping the system at 60° C.

Thereafter, subsequent to withdrawal of the reactant while being diluted with 750 mL of deionized water, the resultant is subject to ultrafiltration by dialysis membrane using the thus-obtained reformed pigment dispersion and highly deionized water followed by ultrasonic wave dispersion to obtain a reformed pigment dispersion in which the solid portion is condensed. It is desirable to remove extra amount of coarse particles by a centrifugal, etc.

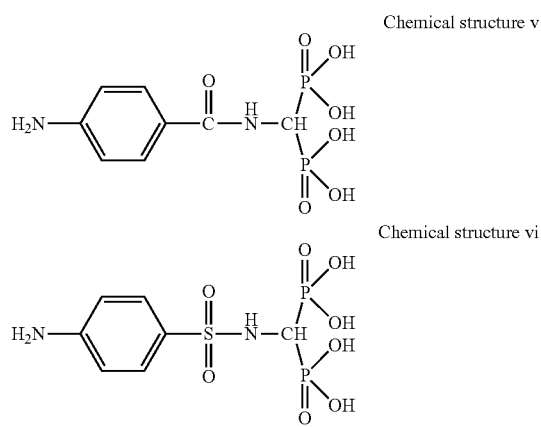

Chemical structure v

Chemical structure vi

Optionally, it is suitable to add a pH regulator to the thus-obtained reformed pigment dispersion. As the pH regulator, the same pH regulator as specified for the ink, which is described later, can be used. Of these pH regulators, $Na^+$, $N(CH_3)_4^+$, $N(C_2H_5)_4^+$, $N(C_3H_7)_4^+$, and $N(C_4H_9)_4^+$ are preferable.

Upon treatment by a pH regulator, the compound represented by Chemical structure v or Chemical structure vi is at least partially changed into a salt thereof (compound corresponding to a compound represented by Chemical structure iii or Chemical structure iv).

As the resin coated pigment in which the surface of the pigment of (3) mentioned above is coated with a resin, a polymer emulsion in which a pigment is contained in a polymer particle is preferable.

The polymer emulsion in which polymer particulates contain the pigment means an emulsion in which the pigments are encapsulated in the polymer particulates or adsorbed on the surface of the polymer particulates. In this case, it is not necessary that all the pigments are encapsulated or adsorbed and some of the pigments may be dispersed in the emulsion unless they have an adverse impact.

Specific examples of the polymers (polymer in the polymer particulates) forming the polymer emulsions include, but are not limited to, vinyl-based polymers, polyester-based polymers, and polyurethane-based polymers. Of these polymers, vinyl-based polymers and polyester-based polymers are particularly preferable and the polymers specified in JP-2000-53897-A and JP-2001-139849-A are suitably used.

In this case, typical organic pigments or complex pigments in which inorganic pigment particles are coated with an organic pigment or carbon black can be used. The complex pigment can be manufactured by a method including precipitating organic pigments in the presence of inorganic pigments, a mechanochemical method including mechanically mixing and grinding inorganic pigments and organic pigments, etc.

Optionally, it is possible to provide an organosilane compound layer formed of polysiloxane and alkylsilane between inorganic pigments and organic pigments to improve the attachability between the inorganic and organic pigments.

The organic pigment and the inorganic pigment have no particular limit and can be suitably selected from the examples mentioned above.

The mass ratio of the inorganic pigment to the organic pigment or carbon black in a complex pigment is preferably from 3:1 to 1:3 and more preferably from 3:2 to 1:2.

When the ratio is too small, coloring property may deteriorate. If the ratio is too large, transparency and saturation may deteriorate.

Suitable specific examples of such complex coloring material particles in which the inorganic pigment particle is covered with the organic pigment or carbon black include, but are not limited to, silica/carbon black complex material, silica/phthalocyanine complex material (PB15:3), silica/disazo yellow complex material, and silica/quinacridone complex material (PR122) (all manufactured by TODAKO-GYO CORP.) because these materials have small primary particle diameters.

When inorganic pigment particles having a primary particle diameter of 20 nm are covered with an equivalent amount of organic pigments, the primary particle diameter of the pigment is about 25 nm. If a suitable dispersant is used to disperse the pigment to the degree of the primary particle diameter, it is possible to manufacture ultrafine pigment dispersion ink having a dispersion particle diameter of 25 nm.

With regard to the complex material, the organic pigment on the surface thereof contributes to dispersion. Also, since the feature of the inorganic pigment disposed in the center of the complex material demonstrates through the thin layer of the organic pigment having a thickness of about 2.5 nm, it is required to suitably select a pigment dispersant capable of stably dispersing both the organic pigment and the inorganic pigment at the same time.

The proportion of the coloring material relative to the entire ink is preferably from 1 to 15 percent by mass and more preferably 2 to 10 percent by mass. When the proportion is 1 percent by mass or greater, the coloring property of the ink and the image density are improved. When the proportion is not greater than 15 percent by mass, the ink does not thicken so that deterioration of discharging property can be prevented. It is also preferable in terms of economy.

Water

As the water, pure water and hyper pure water such as deionized water, ultra filtered water, reverse osmosis water, and distilled water can be used.

The content of the water in the ink has no particular limit and can be selected to suit to a particular application.

Other Components

The other components are not particularly limited and can be selected to suit to a particularly application. For example, foam inhibitors (defoaming agent), water-dispersible resins, pH regulators, preservatives and fungicides, chelate reagents, corrosion inhibitors, anti-oxidants, ultraviolet absorbers, oxygen absorbers, and photostabilizing agents can be selected.

Foam Inhibitor (Defoaming Agent)

A minute amount of the foam inhibitor mentioned above is added to ink to prevent foaming in the ink. The foaming means that liquid forms a thin film enclosing air. The properties such as surface tension and viscosity of ink have impacts on formation of foams. That is, a force to make the surface area of liquid as least as possible is applied. Therefore, liquid such as water having a high surface tension never or little foams. Conversely, ink having a high viscosity and high permeation property tends to foam because the surface tension thereof is low so that the foam formed due to viscosity of the liquid is easily maintained and does not easily break.

Normally, foam inhibitors locally lower the surface tension of foam film or foam inhibitors insoluble in a foaming liquid are dotted on the surface of the foaming agent to break the foam. If a polyether-modified siloxane compound capable of extremely reducing the surface tension is used as surfactant in the ink, even if a foam inhibitor having the former mechanism is used, it is not possible to locally reduce the surface tension of a foam film. Therefore, such foam inhibitors are not normally used. Therefore, the foam inhibitor insoluble in a foaming liquid is used instead. As a result, due to insolubility of the foam inhibitor in the solution, stability of the ink deteriorates.

The proportion of the foam inhibitor relative to the entire ink is preferably from 0.01 to 10 percent by mass and more preferably 0.1 to 5 percent by mass. When the proportion is 0.01 percent by mass or greater, good defoaming property is obtained. When the proportion is not greater than 10 percent by mass, good defoaming property is obtained so that ink properties such as viscosity and particle diameter become suitable.

Water-Dispersible Resin

The water-dispersible resin mentioned above has excellent film-forming (image forming) property, water repellency, water-resistance, and weather resistance. Therefore, these water-dispersible resins are suitable for image recording requiring good water-resistance and high image density (good coloring property).

Specific examples of the water-dispersible resins include, but are not limited to, condensation-based synthetic resins, addition-based synthetic resins, and natural polymers. These can be used alone or in combination.

Specific examples of the condensation-based synthetic resins include, but are not limited to, polyester resins, polyurethane resins, polyepoxy resins, polyamide resins, polyether resins, poly(meth)acrylic resins, acrylic-silicone resins, and fluorochemical resins.

Specific examples of the addition-based synthetic resins include, but are not limited to, polyolefin resins, polystyrene-based resins, polyvinyl alcohol-based resins, polyvinyl ester-based resins, polyacrylic acid-based resins, and unsaturated carboxylic acid-based resins.

Specific examples of the natural polymer include, but are not limited to, celluloses, rosins, and natural rubber.

Of these examples, fluorochemical resins and acrylic-silicone resins are preferable.

As the fluorochemical resin, a fluorochemical resin including fluoro-olefin units is preferable, and a fluorochemical vinyl ether resin formed of fluoro-olefin units and vinyl ether units is more preferable.

There is no specific limitation to the fluoro-olefin unit and it can be selected to suit to a particular application. Specific examples include, but are not limited to, $-CF_2CF_2-$, $-CF_2CF(CF_3)-$, and $-CF_2CFCl-$.

There is no specific limit to the vinyl ether units and it can be selected to suit to a particular application. For example, the compounds represented by the following Chemical structures are suitable.

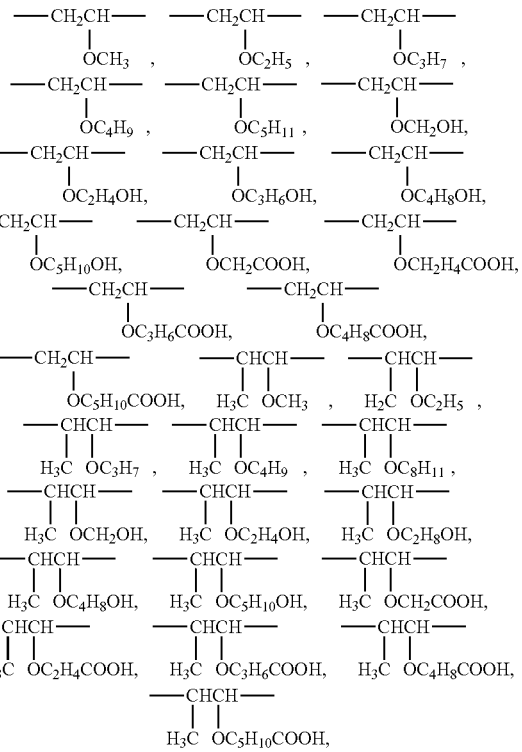

As the fluorochemical vinylether-based resin formed of the fluoroolefin unit and the vinyl ether unit, alternate copolymers in which the fluoro-olefin units and the vinyl ether units are alternately co-polymerized are preferable.

As the fluorochemical resin, any suitably synthesized fluorochemical resin and products available on the market can be used.

Specific examples of the products available on the market include, but are not limited to, FLUONATE FEM-500, FEM-600, DICGUARD F-52S, F-90, F-90M, F-90N, and AQUA FURAN TE-5A (all manufactured by DIC CORPORATION); and LUMIFLON FE4300, FE4500, and FE4400, ASAHI GUARD AG-7105, AG-950, AG-7600, AG-7000, and AG-1100 (all manufactured by ASAHI GLASS CO., LTD.).

The water-dispersible resins can be homopolymers or copolymerized complex resins. Also, any of single phase structure type, core-shell type, and power feed type emulsions is suitable.

As the water-dispersible resin, a resin that has a hydrophilic group with self-dispersibility can be used. Alternatively, a resin having no dispersibility but containing a surfactant or a resin having a hydrophilic group can be used. Of these examples, emulsions of resin particles obtained due to emulsification polymerization or suspension polymerization of ionomers or unsaturated monomers of a polyester resin or polyurethane resin are most suitable. In the case of emulsification polymerization of an unsaturated monomer, since a resin emulsion is obtained by reaction in water to which an unsaturated monomer, a polymerization initiator, a surfactant, a chain transfer agent, a chelate agent, a pH regulator, etc. are added, it is easy to obtain a water-dispersible resin and change the resin components. Since resin constitution can be easily changed, target properties can be easily obtained.

Specific examples of the unsaturated monomers include, but are not limited to, unsaturated carboxylic acids, mono-functional or poly-functional (meth)acrylic ester monomers, (meth)acrylic amide monomers, aromatic vinyl monomers, vinyl cyano compound monomers, vinyl monomers, arylated compound monomers, olefin monomers, dien monomers, and oligomers having unsaturated carbon. These monomers can be used alone or in combination. When these monomers are used in combination, the resin properties can be flexibly reformed. The resin properties can be reformed utilizing polymerization reaction and graft reaction using an oligomer type polymerization initiator.

Specific examples of the unsaturated carboxylic acids include, but are not limited to, acrylic acid, methacrylic acid, itaconic acid, fumaric acid, and maleic acid.

Specific examples of the mono-functional (meth)acrylic ester monomers include, but are not limited to, methyl methacrylate, ethyl methacrylate, isopropyl methacrylate, n-butyl methacrylate, isobutyl methacrylate, n-amyl methacrylate, isoamyl methacrylate, n-hyxyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl aminoethyl methacrylate, methacryloxy ethyltrimethyl ammonium salts, 3-methcryloxy propyl trimethoxy silane, methyl acrylate, ethylacrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl aminoethyl acrylate, and acryloxy ethyl trimethyl ammonium salts.

Specific examples of poly-functional (meth)acrylic ester monomers include, but are not limited to, ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, 2,2'-bis(4-methacryloxy diethoxyphenyl) propane, trimethylol propane trimethacrylate, trimethylol ethane trimethacrylate, polyethylene glycol diacrylate, triethylene glycol diacrylate, 1, 3-butylene glycol diacrylate, 1, 4-butylene glycol diacrylate, 1, 6-hexane diol diacrylate, neopentyl glycol diacrylate, 1,9-nonane diol diacrylate, polypropylene glycol diacrylate, 2,2'-bis(4-acryloxy propyloxyphenyl)propane, 2,2'-bis(4-acryloxy diethoxyphenyl) propane trimethylol propane triacrylate, trimethylol ethane triacrylate, tetramethylol methane triacrylate, ditrimethylol tetraacrylate, tetramethylol methane tetraacrylate, pentaerythritol tetraacrylate, and dipentaerythritol hexaacrylate.

Specific examples of the (meth)acrylic amide monomers include, but are not limited to, acrylic amides, methacrylic amides, N,N-dimethyl acrylic amides, methylene bis acrylic amides, and 2-acrylic amide-2-methyl propane sulfonates.

Specific examples of the aromatic vinyl monomers include, but are not limited to, styrene, α-methylstyrene, vinyl toluene, 4-t-butyl styrene, chlorostyrene, vinyl anisole, vinyl naphthalene, and divinyl benzene.

Specific examples of the vinyl cyano compound monomers include, but are not limited to, acrylonitrile, and methacrylonitrile.

Specific examples of the vinyl monomers include, but are not limited to, vinyl acetate, vinylidene chloride, vinyl chloride, vinyl ether, vinyl ketone, vinyl pyrolidone, vinyl sulfonic acid and its salts, vinyl trimethoxy silane, and vinyl triethoxy silane.

Specific examples of the arylated compound monomers include, but are not limited to, aryl sulfonic acid and its salts, aryl amine, aryl chloride, diaryl amine, and diaryl dimethyl ammonium salts.

Specific examples of the olefin monomers include, but are not limited to, ethylene and propylene.

Specific examples of the dien monomers include, but are not limited to, butadiene and chloroprene.

Specific examples of the oligomers having unsaturated carbon include, but are not limited to, styrene oligomers having a methacryloyl group, styrene-acrylonitrile oligomers having a methacryloyl group, methyl methacrylate oligomers having a methacryloyl group, dimethyl siloxane oligomers having a methacryloyl group, and polyester oligomers having an acryloyl group, Since breakage in molecule chains such as dispersion destruction and hydrolytic cleavage occurs to the water-dispersible resins under a strong alkali or strong acid environment, pH is preferably from 4 to 12, more preferably from 6 to 11, and furthermore preferably from 7 to 10 in terms of the miscibility with the water-dispersible coloring material.

The volume average particle diameter of the water-dispersible resin relates to the viscosity of a liquid dispersion. If the compositions are the same, the viscosity of the same solid portion increases as the particle diameter decreases. To avoid manufacturing ink having an excessively high viscosity, the volume average particle diameter of the water-dispersible resin is preferably 50 nm or greater.

In addition, particles having a particle diameter as large as several tens μm are larger than the size of the nozzle orifice of an ink jet head. Therefore, particles of that size are not suitable. When particles smaller than the nozzle mouth are present in the ink, the discharging property of the ink deteriorates. The volume average particle diameter of the water-dispersible resin in the ink is preferably 200 nm or less and more preferably 150 nm or less in order not to degrade the ink discharging property.

In addition, it is preferable that the water-dispersible resin has a feature of fixing the coloring material on paper and forms a film at room temperature to enhance fixability of the coloring material. Therefore, the minimum film-forming temperature (MFT) of the water-dispersible resin is preferably 30° C. or lower. In addition, when the glass transition temperature of the water-dispersible resin is −40° C. or lower, viscosity of the resin film increases, thereby causing tackiness on obtained printed matter. Therefore, the glass transition temperature of the water-dispersible resin is preferably −30° C. or higher.

The proportion of the water-dispersible resin relative to the entire ink is preferably from 0.5 to 15 percent by mass and more preferably from 1 to 8 percent by mass in solid form.

pH Regulator

There is no specific limitation to the pH regulator as long as it is capable of regulating pH of the ink to be from 7 to 11 without having an adverse impact on the ink. It can be selected to suit to a particular application. Specific examples include, but are not limited to, alcohol amines, hydroxides of alkali metal elements, ammonium hydroxides, phosphonium hydroxides, and carbonates of alkali metal elements. When the pH is in the range of from 7 to 11, there is not much dissolved inkjet head or ink supplying unit. Therefore, modification, leakage, poor discharging performance, etc. of the ink can be prevented.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the ammonium hydroxides include, but are not limited to, ammonium hydroxide and quaternary ammonium hydroxide.

A specific example of the phosphonium hydroxides is quaternary phosphonium hydroxide.

Specific examples of the carbonates of alkali metal elements include, but are not limited to, lithium carbonate, sodium carbonate, and potassium carbonate.

Preservatives and Fungicides

Specific examples of the preservatives and fungicides include, but are not limited to, dehydrosodium acetate, sodium sorbinate, sodium 2-pyridine thiol-1-oxide, sodium benzoate, and pentachlorophenol sodium.

Chelate Reagent

Specific examples of the chelate reagents include, but are not limited to, ethylene diamine sodium tetraacetate, nitrilo sodium triacetate, hydroxyethylethylene diamine sodium tri-acetate, diethylenetriamine sodium quinternary acetate, and uramil sodium diacetate.

Corrosion Inhibitor

Specific examples of the corrosion inhibitor include, but are not limited to, acid sulfite, thiosodium sulfate, antimony thioglycollate, diisopropyl ammonium nitrite, pentaerythritol tetranitrate, and dicyclohexyl ammonium nitrite.

Anti-Oxidant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Wax

The wax having low melting point and small frictional resistance is preferable.

Specific examples of the wax include the following:
Polyethylene wax 1: AQUACER 531, melting point of 130° C., manufactured by BYK Japan KK;
Polyethylene wax 2: AQUACER 515, melting point of 135° C., manufactured by BYK Japan KK; and
Polyethylene wax 3: AQUACER 3RC1452, melting point of 130° C., manufactured by BYK Japan KK.

Before the addition of the wax, it is diluted with deionized water in such a manner that concentration of the solid portion is 30 percent by mass.

Method of Manufacturing Ink

The coloring material, the organic solvent, the surfactant, and the other optional components are dispersed or dissolved in water and thereafter stirred and mixed to manufacture the ink of the present disclosure. For stirring and mixing, devices such as a sand mill, a homogenizer, a ball mill, a paint shaker, an ultrasonic wave dispersing device, a stirrer having a stirring wing, a magnetic stirrer, a high performance, and dispersing device are used.

Ink Properties

Properties of the ink are not particularly limited and can be selected to suit to a particular application. Preferably, viscosity, surface tension, etc., are controlled in the following ranges.

Viscosity of the ink is preferably from 5 to 25 mPa·S at 25° C. More preferably, viscosity of the ink at 25° C. is in the range of from 6 to 20 mPa·S. When the ink viscosity is 5 mPa·S or greater, printing density and text quality are enhanced. When the ink viscosity is 25 mPa·S or less, the ink discharging property is suitably secured.

The viscosity can be measured by a viscometer (RE-550L, manufactured by TOKI SANGYO CO., LTD.) at 25° C.

The ink of the present disclosure can be suitably used for inkjet recording or spray painting.

The ink for inkjet recording is used in any printer having an inkjet head such as a piezoelectric element type in which ink droplets are discharged by transforming a vibration plate forming the wall of the ink flowing path using a piezoelectric element as a pressure generating device to press the ink in the ink flowing path as described in JP-H2-51734-A; a thermal type in which bubbles are produced by heating ink in the ink flowing path with a heat element as described in JP-S61-59911-A; and an electrostatic type in which ink droplets are discharged by changes of the volume in the ink flowing path caused by transforming a vibration plate that forms the wall surface of the ink flowing path by a force of electrostatic generated between the vibration plate and the electrode while the vibration plate and the electrode are provided facing each other as described in JP-H6-71882-A.

Ink Set

The ink of the present disclosure may be a color ink such as a yellow ink, a magenta ink or a cyan ink, or a black ink. Each ink is independently the ink of the present disclosure. The ink set can be prepared by combining the color ink and the black ink. Preferably, the color ink and the black ink are independently the ink of the present invention.

Ink Container

The ink container of the present disclosure accommodates the ink of the present disclosure or each ink used for the ink set in a container. The ink container can be used as an ink cartridge having other optional suitably-selected members.

There is no specific limit to the ink container. It is possible to select any form, any structure, any size, and any material to suit to a particular application. For example, an ink container including an ink bag (vessel) made of aluminum laminate film, plastic film, etc. can be suitably used.

Figure 2:
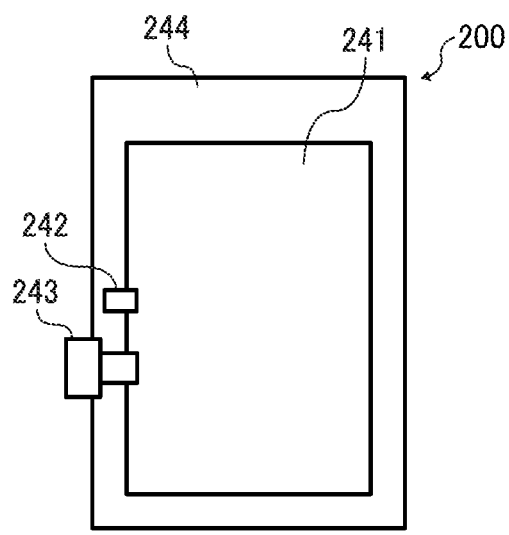
FIG. 2 is a schematic diagram illustrating an example of the ink cartridge accommodated in a housing.

Next, the ink cartridge is described in detail with reference to FIGS. 1 and 2. FIG. 1 is a diagram illustrating an example of the ink cartridge. FIG. 2 is a diagram illustrating the ink cartridge illustrated in FIG. 1, including the housing thereof.

As illustrated in FIG. 1, in an ink cartridge 200, an ink bag 241 is filled with the ink for inkjet recording described above through an ink inlet 242. Subsequent to evacuation of air, the ink inlet 242 is closed by fusion. When in use, an ink outlet 243 made of rubber material is pierced by a needle installed onto an inkjet recording device to supply the ink into the device.

The ink bag 241 is made of a packaging material such as aluminum laminate film having no air permeability. The ink bag 241 is normally accommodated in a cartridge housing 244 made of plastic as illustrated in FIG. 2 and detachably attached to various image forming apparatus.

Image Forming Method and Image Forming Apparatus

The image forming method of the present disclosure includes an applying process to apply the ink of the present disclosure to a recording medium and other suitably-selected optional processes.

The image forming apparatus of the present disclosure includes an ink of the present disclosure, an applying device to apply the ink to a recording medium, and other suitably-selected optional devices.

The image forming method of the present disclosure is executed by the image forming apparatus of the present disclosure and the applying process is suitably conducted by the applying device. In addition, the other processes are suitably conducted by the other corresponding devices.

Ink Applying Process and Ink Applying Device

The ink applying process includes discharging the ink of the present disclosure to form images on a recording medium.

The ink applying device discharges the ink of the present disclosure by adding stimulus (energy) to form images on a recording medium. There is no specific limit to the ink applying device. For example, various nozzles for ink discharging can be suitably used.

There is no specific limit to how the ink is applied (discharged). For example, a method can be used in which thermal energy corresponding to recording signals is applied by, for example, a thermal head to produce foams in the ink and the ink is jetted and sprayed as liquid droplets from through orifices of nozzles of the recording head by the pressure of the foams. In addition, for example, a method can be used in which a voltage is applied to a piezoelectric element attached to the position referred to as a pressure chamber located in the ink flow path in a recording head to bend the piezoelectric element to contract the volume of the pressure chamber, thereby jetting and spraying the ink from the orifices of nozzles of the recording head as liquid droplets.

Other Processes and Other Devices

The other optional processes are not particularly limited and can be suitably selected to suit to a particular application. Examples are a drying process and a control process.

The other optional devices are not particularly limited and can be selected to suit to a particular application. Examples are a drying device and a control device.

Drying Process and Drying Device

The drying process is to heat and dry a recording medium on which an image is recorded with the ink. The drying process is executed by a drying device.

The drying is not particularly limited and can be selected to suit to a particular application. For example, the drying can be conducted by an infrared drier, a microwave drier, a roll heater, a drum heater, or heated air. Moreover, it is also suitable to include a fixing process of heating the surface of an image to smooth the surface and fix the image with a heater to 100 to 150° C.

The fixing process improves gloss and fixability of image recorded matter. A roller, a drum heater, etc. having a heated mirror surface is preferably used as the heating and fixing device and the mirror surface (smoothing portion) is brought into contact with the image formed surface. Taking into account image quality, safety, and economy, a fixing roller heated to 100 to 150° C. is preferable.

Control Process and Control Device

The control process mentioned above is to control each process and can be suitably conducted by the control device.

The control device (controller) has no particular limit as long as it can control the behavior of each device. It can be selected to suit to a particular application. For example, devices such as a sequencer and a computer are preferable.

One embodiment of conducting the inkjet recording method of the present invention using the image forming apparatus of the present disclosure is described with reference to the accompanying drawings.

Figure 3:
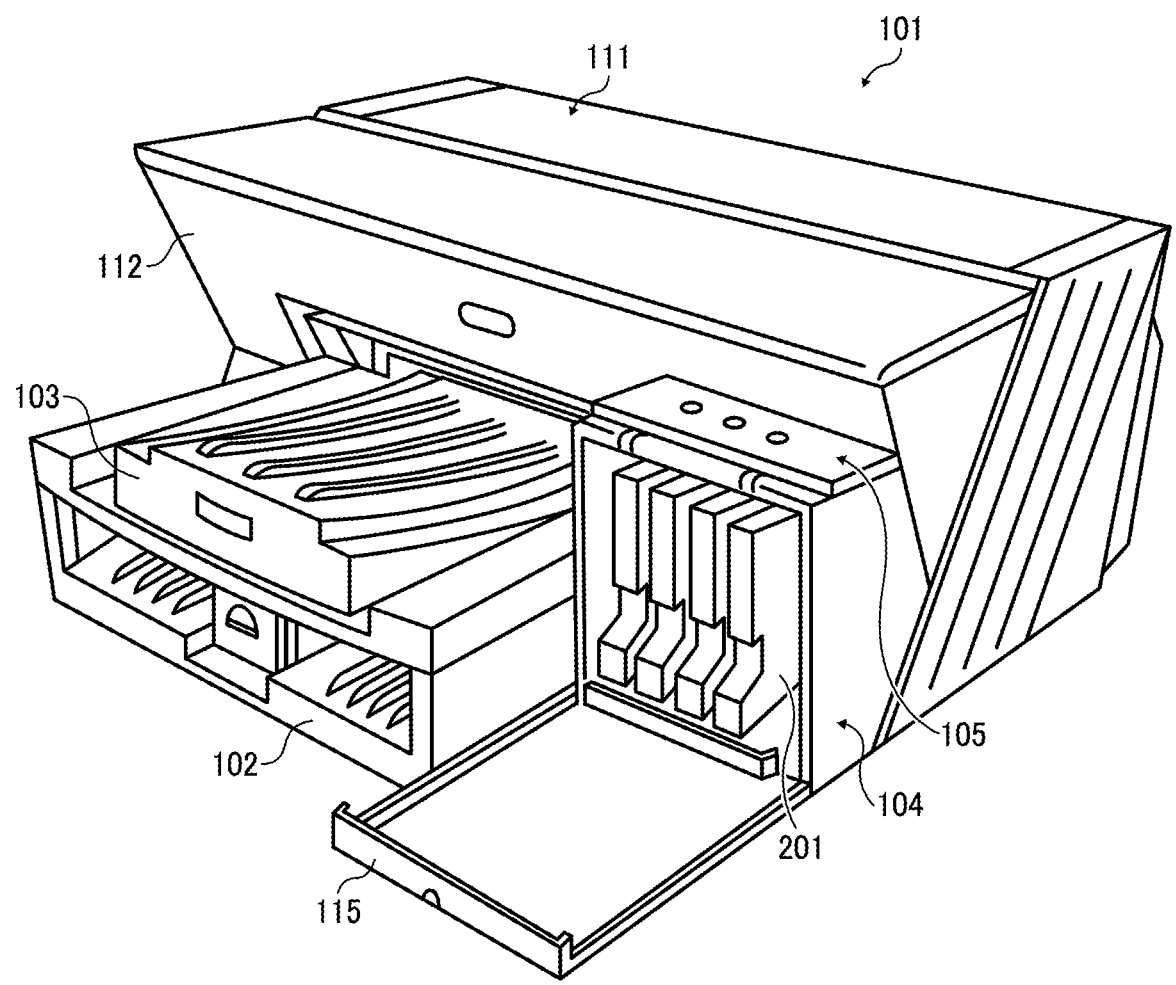
FIG. 3 is a schematic diagram illustrating a perspective view of an example of the image forming apparatus.

An inkjet recording device 101 illustrated in FIG. 3 has a sheet feeder tray 102 to accommodate recording medium placed therein, an ejection tray 103 installed in the inkjet recording device 101, which stores recording medium on which images are recorded (formed), and an ink cartridge installation unit 104. Various recording medium can be fed using this sheet feeder tray 102. The reference numerals 111 and 112 respectively represent a top cover and a front cover.

On the upper surface of the ink cartridge installation unit 104 is arranged an operation unit 105 including operation keys, a display, etc. The ink cartridge installation unit 104 includes an ink cartridge front cover 115 that is openable and closable to detach and attach the ink cartridge 200.

Figure 4:
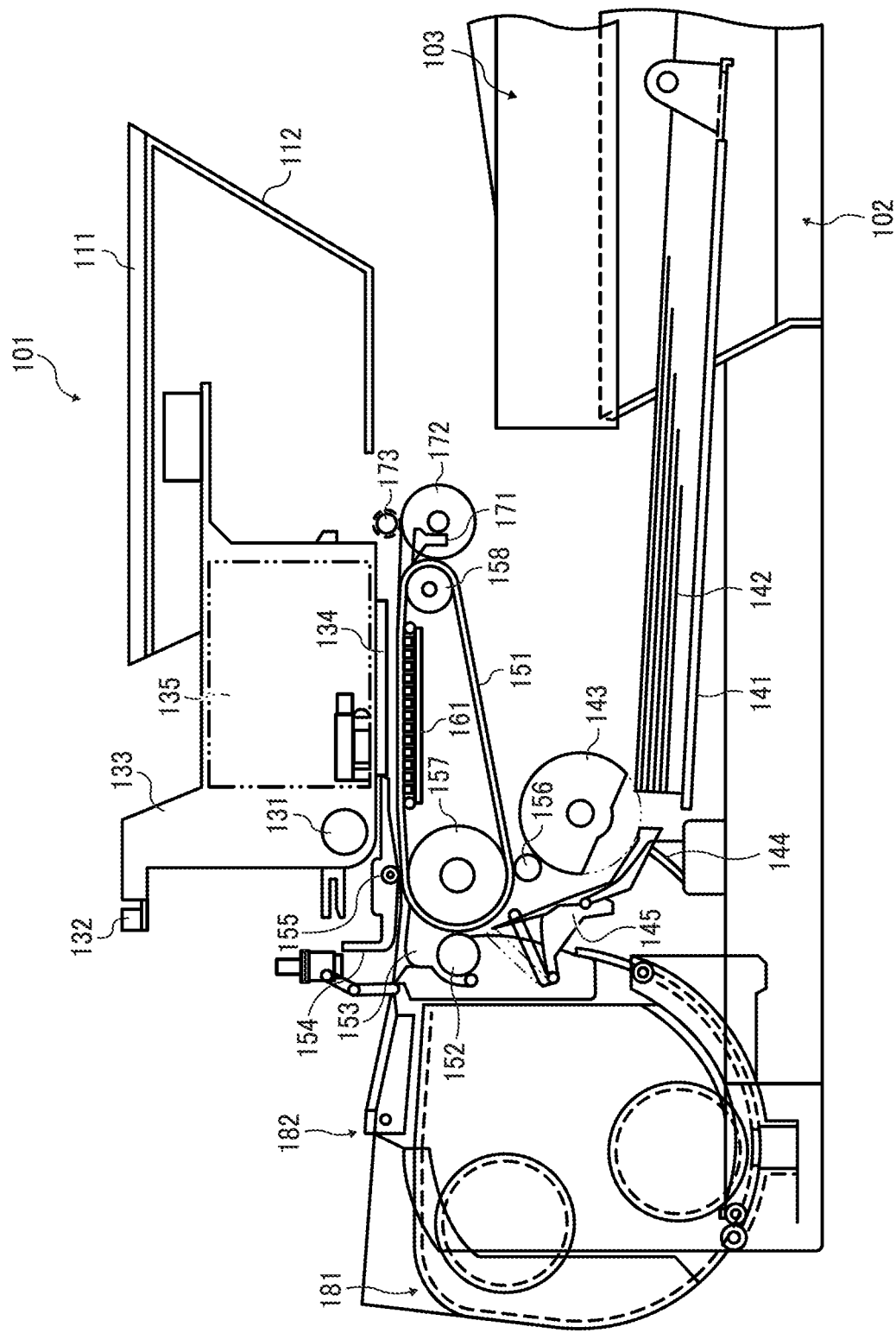
FIG. 4 is a schematic diagram illustrating a sectional view of an example of the entire configuration of the image forming apparatus.
Figure 5:
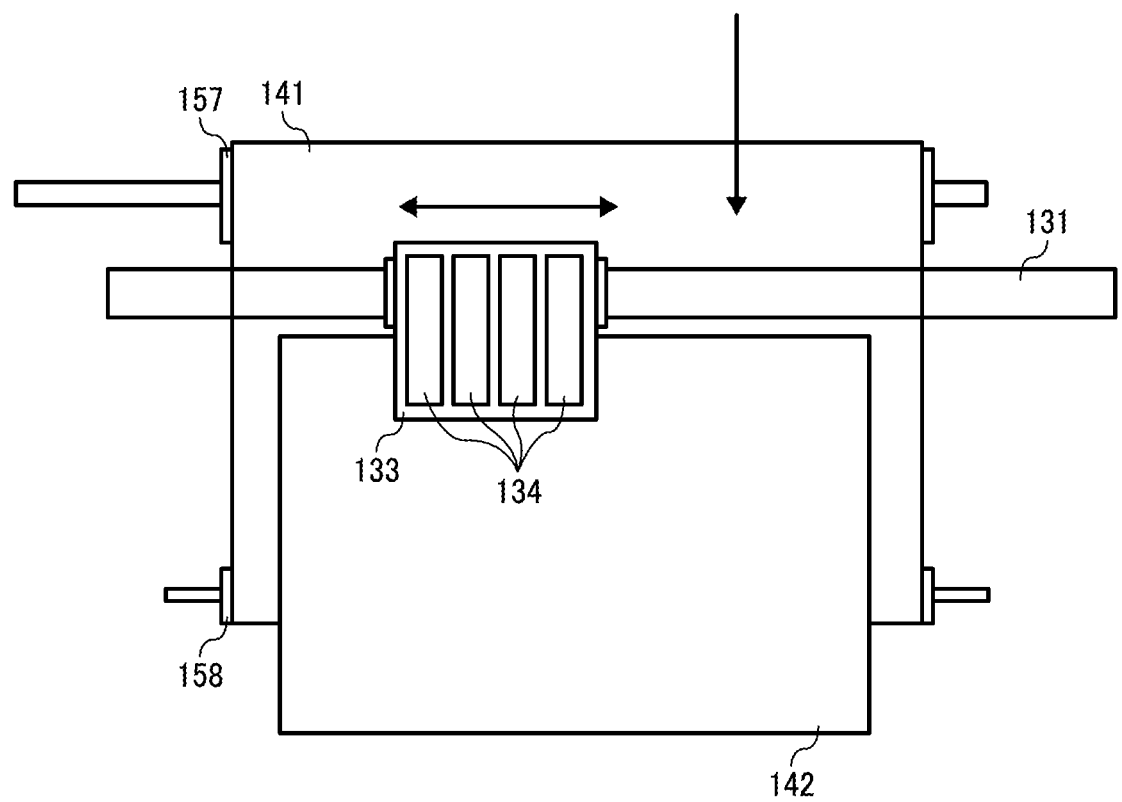
FIG. 5 is a schematic diagram illustrating an example of an applying device configured to apply the ink.

Inside the inkjet recording device 101, as illustrated in FIGS. 4 and 5, a guide rod 131 serving as a guiding member that laterally bridges side plates on the right hand side and left hand side and a stay 132 slidably hold a carriage 133 in the main scanning direction. A main scanning motor moves the carriage 133 in the direction indicated by the arrow in FIG. 5.

The carriage 133 has a recording head 134 including four inkjet recording heads that discharge ink droplets of each color of yellow (Y), cyan (C), magenta (M), and black (Bk) while multiple ink discharging orifices are arranged in the direction crossing the main scanning direction with the ink droplet discharging direction downward.

As the heads for inkjet recording that constitute the recording head 134, it is possible to use a device having an energy-generating device to discharge an ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 includes sub tanks 135 for colors to supply each color ink to the recording head 134. The ink is supplied and replenished to the sub-tank 135 via an ink supplying tube from the ink cartridge 200 mounted onto the ink cartridge installation unit 104.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while being biased towards the sheet feeding roller 143.

A conveyance unit to convey the sheet 142 fed from the sheet feeding unit below the recording head 134 includes a conveying belt 151 to electrostatically adsorb and convey the sheet 142, a counter roller 152 to convey the sheet 142 fed from the sheet feeding unit via a guide 145 while pinching the sheet 142 with the conveying belt 151, a conveying guide 153 to make the sheet 142 track on the transfer belt 151 by changing the conveying direction of the sheet 142 being sent substantially vertically upward by substantially 90 degrees, a front end pressure roller 155 biased towards the conveying belt 151 by a pressure member 154, and a charging roller 156 to charge the surface of the conveying belt 151.

The conveying belt 151 is an endless form belt, suspended between a conveying roller 157 and a tension roller 158 and rotatable in the belt conveying direction. This conveying belt 151 includes, for example, a top layer serving as a sheet adsorption surface made of a resin material such as a copolymer (ETFE) of tetrafluoroethylene and ethylene with no resistance treatment having a thickness of about 40 μm, and a bottom layer (moderate resistance layer, earth layer) made of the same material as the top layer with resistance treatment with carbon.

On the rear side of the conveying belt 151, a guiding member 161 is disposed corresponding to the print area by the recording head 134. An ejection unit to eject the sheet 142 on which images are recorded by the recording head 134 includes a separation claw 171 to separate the sheet 142 from the conveying belt 151, an ejection roller 172, and an ejection roller 173. An ejection tray 103 is arranged below the ejection roller 172.

A duplex printing sheet feeding unit 181 is mounted in a detachable and attachable manner to the rear side of the inkjet recording device 101.

The duplex printing sheet feeding unit 181 takes in and reverses the sheet 142 that is returned by the reverse rotation of the conveying belt 151 and feeds it again between the counter roller 152 and the conveying belt 151. A bypass sheet feeding unit 182 is provided on the upper surface of the duplex printing sheet feeding unit 181

In this image forming apparatus (inkjet recording device), the sheet 142 is separated and fed from the sheet feeding unit one by one substantially vertically upward, guided by the guide 145, and conveyed while being pinched between the conveying belt 151 and the counter roller 152. Furthermore, the front end of the substrate 142 is guided by the conveying guide 153 and pressed against the transfer belt 151 by the front end pressure roller 155 to change the conveying direction substantially 90 degrees.

Since the conveying belt 151 is charged by the charging roller 156 at this point, the sheet 142 is electrostatically adsorbed to the conveying belt 151 and transferred. Due to drive of the recording head 134 in response to the image signal while moving the carriage 133, the ink droplet is discharged to the sheet 142 not in motion to record an image in an amount of one line and thereafter the sheet 142 is conveyed in a predetermined amount to be ready for the recording for the next line. On receiving a signal indicating that the recording has completed or the rear end of the sheet 142 has reached the image recording area, the recording operation stops and the sheet 142 is ejected to the ejection tray 103.

When the amount of ink remaining in the sub-tank 135 approaching to empty is detected, a predetermined amount of the ink is replenished to the sub tank 135 from the ink cartridge 200.

In this inkjet recording device, it is possible to dissemble the chassis of the ink cartridge 200 and replace only the ink bag therein when the ink is used up in the ink cartridge 200. In addition, the ink cartridge 200 stably supplies the ink even when the ink cartridge 200 is placed on its side and installed by front loading. Therefore, even when the upside of the inkjet recording device 101 is blocked, for example, it is placed in a rack or something is placed on the upper surface of the inkjet recording device 101, the ink cartridge 200 can be easily exchanged.

A serial type (shuttle type) in which the carriage scans is used in this description but this is also true in a line-type image recording device having a line type head.

In addition, the image forming apparatus and the image forming method of the present disclosure are applicable to, in particular, recording systems employing inkjet recording such as printers for inkjet recording, facsimile machines, photocopiers, multi-functional machines (printer/facsimile/photocopier).

Image Formed Matter

The image formed matter of the present disclosure is configured by a recording medium on which an image is formed using the ink of the present disclosure.

Recording Medium

There is no specific limitation to the recording medium and it can be selected to suit to a particular application. For example, plain paper, gloss paper, special paper, cloth, film, transparent sheets, general printing paper, etc. are suitable.

The image formed matter is of high quality image without blur and excellent in stability over time so that it can be suitably used for various purposes as references, etc., on which images, etc. are recorded.

Of these recording media, in terms of recording images having high quality (image density, saturation, beading, color bleed) and high gloss with excellent smear fixability, general printing paper having a liquid imbibition in a particular range is preferable. A specific example is a recording medium having a coated layer on at least one side thereof and the side having the coated layer preferably has a transfer amount of pure water to the recording medium of from 2 to 35 ml/m$^2$ in a contact time of 100 ms and a transfer amount of pure water to the recording medium of from 3 to 40 ml/m$^2$ in a contact time of 400 ms as measured by a dynamic scanning absorptometer (DSA).

When a recording medium having an excessively small transfer amount of pure water is used, beading (a phenomenon in which adjacent dots attracted to each other make images feel rough) and color bleed (bleeding between colors) tend to occur even if the ink mentioned above is used. When a recording medium having an excessively large transfer amount of pure water is used, the ink dot diameter after recording tends to become smaller than desired, so that solid images may not be filled with the ink.

The dynamic scanning absorptometer (DSA; Journal of JAPAN TAPPI, Vol. 48, p 88 to p 92, published in May 1994, authored by Kuga, Shigenori) can accurately measure the imbibition liquid amount in an extremely short time. Measuring by utilizing this dynamic scanning absorptometer is automated according to the method of: (1) directly reading the absorption speed of liquid from the moving of meniscus in a capillary; and (2) spirally scanning a sample having a disc-like form with an imbibition head, while automatically changing the scanning speed according to predetermined patterns to measure the necessary number of points of this single sample. The liquid supply head to the paper sample is connected with the capillary via a TEFLON® tube and the position of the meniscus in the capillary is automatically read by an optical sensor. Specifically, the transfer amount of pure water is measured using a dynamic scanning absorptometer (K350 Series D type, manufactured by Kyowa Seiko Inc.). Each of the transfer amount in the contact time of 100 ms can be obtained by interpolation of the measuring results of the transfer amount in the proximity contact time of the respective contact periods of time.

General printing paper having a liquid imbibition in a particular range is available on the market.

Specific examples include, but are not limited to, POD gloss coat, OK TOP COAT+, OK KINFUJI+, and SA KINFUJI+ (manufactured by Oji Paper Co., Ltd.), SUPER MI DUL, AURORA COAT, and SPACE DX (manufactured by Nippon Paper Industries Co., Ltd.), α matte and μ coat (manufactured by Hoketsu Paper Co., Ltd.), RAICHO ART and RAICHO SUPER ART (manufactured by Chuetsu Pulp & Paper Co., Ltd.), and PEARL COAT N (manufactured by Mitsubishi Paper Mills Limited).

EXAMPLES

Next, the present disclosure is described in detail with reference to Examples but is not limited thereto. In addition, "parts" and "%" represent "parts by mass" and "% by mass" unless otherwise specified.

Pigment Dispersion Covered with Water-Insoluble Vinyl Polymer

As the water-dispersible pigment, a pigment covered with a water-insoluble vinyl polymer is used. To obtain a water dispersion of this pigment, the water-insoluble vinyl polymer is dissolved in an organic solvent. The pigment, water, a neutralizing agent, and other optional surfactants are added to the solution. Subsequent to mixing and kneading, water is optionally added to dilute the resultant and the organic solvent is distilled away to make it aqueous.

Manufacturing Examples 1 to 3 of Water-Insoluble Vinyl Polymer 20 parts of methylethyl ketone, 0.03 parts of polymerization chain transfer agent (2-mercapto ethanol), and 10 percent by mass of each of monomers shown in Table 1 (represented in parts by mass) were mixed followed by sufficient nitrogen replacement to obtain a liquid mixture.

The rest (90 percent by mass) of each monomer (represented in parts by mass) shown in Table 1 was placed in a dripping funnel. Thereafter, 0.27 parts of a polymerization chain transfer agent (2-mercapto ethanol), 60 parts of methylethyl ketone, and 1.2 parts of 2,2'-azobis(2-4-dimethyl valeronitrile) were placed in the dripping funnel followed by mixing and sufficient nitrogen gas replacement to obtain a liquid mixture.

In a nitrogen atmosphere, the liquid mixture in the reaction container was stirred and heated to 75° C. The liquid mixture in the dripping funnel was slowly dripped to the reaction container in three hours. After the dripping, the liquid temperature of the thus-obtained liquid mixture was maintained at 75° C. for two hours. Thereafter, a solution in which 0.3 parts of 2,2'-azobis(2,4-dimethyl valeronitrile) was dissolved in 5 parts of methylethyl ketone was added to the thus-obtained liquid mixture followed by two-hour aging at 75° C. and another two-hour aging at 85° C. to obtain a polymer solution.

The thus-obtained polymer solution was partially dried at 105° C. with a reduced pressure for two hours to remove the solvent for isolation. A mass average molecular mass was measured by gel permeation chromatography using polystyrene as the reference material and 60 mmol/L of phosphoric acid and 50 mmol/L of dimethyl formamide containing lithium bromide as solvents.

The details of each compound shown in Table 1 are as follows.

ethoxypolyethylene glycol monomethacrylate: a monomer in which n is 9, $R_1$ is a methyl group, $R_2$ is an ethylene group, and $R_3$ is an ethyl group in the following Chemical formula XXIII.

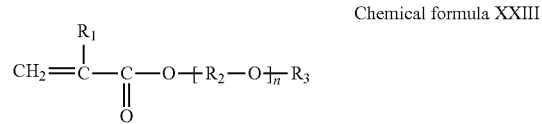

Chemical formula XXIII octoxy polypropylene glycol-polypropylene glycol monomethacrylate: a monomer in which n is 6 (average number of adducts of mols of polyethylene glycol is 4, average number of adducts of mols of polypropylene glycol is 2), $R_1$ is a methyl group, $R_2$ is an ethylene group or a polypropylene group, and $R_3$ is an octyl group, and oxyethylene group and oxyethylene propylene group are randomly adducted in Chemical formula XXIII illustrated above.

polyethylene glycol monomethacrylate: a monomer in which n is 15, $R_1$ is a methyl group, $R_2$ is an ethylene group, and $R_3$ is a hydrogen atom in Chemical formula XXIII illustrated above, methacrylic acid: GE-110 (MMA), manufactured by MITSUBISHI GAS CHEMICAL COMPANY, INC.

2-Ethylhexyl Methacrylate: "Akuri Ester EH", manufactured by Mitsubishi Rayon Co., Ltd.

styrene monomer: styrene monomer, manufactured by NIPPON STEEL & SUMIKIN CHEMICAL CO., LTD.

styrene macromer: AS-6S (styrene macromer), number average molecular weight of 6,000, manufactured by TOAGOSEI CO., LTD.

TABLE 1

| | Polymer Manufacturing Example | | |
|---|---|---|---|
| Monomer | 1 | 2 | 3 |
| Ethoxypolyethylene glycol monomethacrylate (n = 9) | 10 | | |
| Octoxypolyethylene glycol polypropylene glycol monomethacrylate (n = 6) | | 10 | |
| polyethylene glycol monomethacrylate (n = 15) | | | 10 |
| Methacrylic acid | 12 | 14 | 12 |
| 2-Ethylhexyl methacrylate | 22 | 20 | 22 |
| Styrene monomer | 46 | 46 | 46 |
| Styrene macromer | 10 | 10 | 10 |
| Mass average molecular mass | 32000 | 40000 | 40000 |
| Degree of neutralization (percent) | 90 | 90 | 90 |

Preparation Examples 1 to 4 of Pigment Dispersion Covered with Water-Insoluble Vinyl Polymer 90 parts of methylethyl ketone and a predetermined amount of neutralizing agent (5N sodium hydroxide aqueous solution) were added to 77 parts of a solution in which each of the polymers obtained in Manufacturing Examples 1 to 3 of Water-insoluble Vinyl Polymer was separately prepared to be 50 percent with methylethyl ketone to neutralize methacrylic acid (degree of neutralization of 90 percent). Thereafter, 370 parts of deionized water and 90 parts of the pigment shown in Table 2 as coloring material were admixed followed by 20 passes with a dispersing machine (Microfluidizer M-140K, 150 MPa). The number of pass with the dispersing machine was 5 in the case of carbon black Nipex 150.

100 parts of deionized water was added to the thus-obtained water dispersion. Subsequent to stirring, methylethyl ketone was removed at 60° C. with a reduced pressure. After water was further partially removed, the resultant was filtrated with a 25 mL volume needle-free syringe (manufactured by TERUMO CORPORATION) equipped with a syringe filter having an opening of 5 μm (acetyl cellulose film, outer diameter of 2.5 cm, manufactured by Sartorius Stedim Biotech GmbH) to remove coarse particles. Thus, a water dispersion having a solid portion of 25 percent by mass was obtained.

TABLE 2

| Preparation Example | Polymer Manufacturing Example | Pigment |
|---|---|---|
| 1 | 1 | Carbon black Nipex 150 (manufactured by Degussa AG) |
| 2 | 2 | C.I. Pigment Red 122 (manufactured by Dainichiseika Color & Chemicals Mfg. Co., Ltd.) |
| 3 | 3 | C.I. Pigment Red 122 (manufactured by Dainichiseika Color & Chemicals Mfg. Co., Ltd.) |
| 4 | 3 | C.I. Pigment red blue 15:3 (manufactured by Dainichiseika Color & Chemicals Mfg. Co., Ltd.) |

Manufacturing Examples of resin emulsions added to ink to impart fixability are described as follows.

Manufacturing Examples 1 to 2 of Resin Emulsion

Manufacturing of Resin Emulsion 1

A mixture of 5.0 parts by mass of acrylic acid, 6.0 parts of vinyltrimethxy silane (Sila-Ace 210, manufactured by CHISSO CORPORATION), 6.0 parts by mass of 2-ethylhexyl methacrylate, 22.0 parts by mass of 2-ethylhexyl acrylate, 5.0 parts by mass of cyclohexyl methacrylate, 22.0 parts by mass of styrene, 1.5 parts of AQUALON KH-20 (reactive emulsifier, manufactured by DKS Co. Ltd.) as emulsifier, and 53.1 parts of deionized water were emulsified by a batch type homomixer to prepare a monomer pre-emulsion, which was placed in a dripping tank.

If the number of particles having a diameter of 0.5 μm or greater is 5,000 particles/cm$^3$ or more, the measuring precision deteriorates. Therefore, in order to make the number of the particles having a diameter of 0.5 μm or greater to be around 5,000 particles/cm$^3$, the monomer pre-emulsion having a monomer concentration of around 60 percent was diluted with distilled water. The volume average particle diameter of the monomer pre-emulsion about the diluted liquid in which the monomer concentration was about 0.002 percent by mass was 3.0 μm according to the number counting method for monomer pre-emulsion as measured by Accusizer (manufactured by PARTICLE SIZING SYSTEMS, USA).

89.4 parts of deionized water was loaded in a four-necked flask (having a volume of 2 L) as a reaction container equipped with a reflux condenser, a stirrer, a thermometer, a nitrogen introducing tube, and an inlet through which raw material was loaded. The liquid was stirred and heated to 60° C. while introducing nitrogen into the flask. Thereafter, 0.5 parts of AQUALON KH-20 (manufactured by DKS Co. Ltd.) as alkylphenolether-based reactive emulsifier was added to the reaction container and at the same time, 6 parts of 5 percent by mass ammonium persulfate (hereinafter referred to as APS) (0.3 parts as ammonium persulfate) was added thereto.

10 minutes after the 5 percent APS aqueous solution was added to the reaction container, the monomer pre-emulsion was continuously dripped from the dripping tank to the reaction container in five hours. Also, 6 parts of the 5 percent by mass APS aqueous solution (0.3 parts as ammonium persulfate) was incessantly dripped from another dropping tank to the reaction container in five hours. The reaction container was maintained at 70° C.

After the dripping, the resultant was aged at 70° C. for three hours. Thereafter, the resultant was cooled down to 50° C. and ammonium water was added followed by filtration using a polyester cloth of 180 meshes. The agglomeration matter remaining on the filter cloth was dried at 150° C. for 20 minutes. The agglomeration amount (percent by mass) was 0.1 percent by mass when obtained based on the amount of the monomer, the emulsifier, and the polymerization initiator.

The resin emulsion was partially measured and taken out after the filtration and dried at 150° C. for 20 minutes. The concentration of the solid portion was 39.4 percent by mass. In addition, the resin emulsion had a pH of 8 and a viscosity of 50 mPa·s.

The limit of the measuring device is around 5,000 particles/cm$^3$ or less for particles having a size of 0.5 μm or greater. Therefore, the resin emulsion after the filtration was diluted to have a solid portion concentration of 0.002 percent by mass in order to be within such a range. The 50 percent cumulative volume particle diameter ($D_{50}$) was 80 nm according to dynamic light scattering method using microtrac UPA (manufactured by Leeds & Northrup).

Separately, after the filtration, the resin emulsion was diluted to have a solid portion concentration of 0.002 percent by mass and the diluted liquid was subject to number counting method to obtain the number of super coarse particles having a particle diameter of 1.5 μm or greater using Accusizer (manufactured by PARTICLE SIZING SYSTEMS, USA). The number of super coarse particles having a particle diameter of 1.5 μm or greater in the resin emulsion was $1.0 \times 10^5$ particles/cm$^3$ in conversion of 0.1 percent by mass of the solid portion concentration.

The glass transition temperature (hereinafter, referred to as theoretical Tg) obtained from the monomers excluding vinyl trimethoxyxilane was 30° C.

Manufacturing of Resin Emulsion 2

Resin emulsion 2 was manufactured in the same manner as in Manufacturing of Resin Emulsion 1 except that the recipe in the Manufacturing Example 1 was changed to the following recipe.

Composition
Methacrylic acid: 3.0 parts
Butyl acrylate: 25.0 parts
Acrylamide: 1.0 parts
Styrene: 29.0 parts
Vinyl trimethoxyxilane (Sila-Ace 210, manufactured by Chisso Corporation): 6 parts The 50 percent cumulative volume particle diameter ($D_{50}$) of the thus-obtained resin emulsion 2 was 80 nm as measured by dynamic light scattering method. In addition, the theoretical Tg obtained from the monomers excluding vinyl trimethoxyxilane was 45° C. The solid portion concentration was 39.5 percent by mass.

Example 1

Preparation of Ink 15.00 parts of 3-n-buthoxy-N,N-dimethyl propanamide represented by Chemical structure I, 20.00 parts of 1,2-propanediol, 0.50 parts of polyether-modified siloxane compound represented by Chemical formula II, 0.25 parts of aliphatic alcohol alkylene oxide compound represented by Chemical formula VI, and 0.40 parts of antifoaming agent (2,4,7,9-tetramethyldecane-4,7-diol) were loaded in a container equipped with a stirrer and stirred for 30 minutes to obtain a homogeneous mixture.

Thereafter, 0.05 parts of mildew-proofing agent (Proxel GXL, manufactured by AVECIA GROUP), 0.20 parts of 2-amino-2-ethyl-1,3-propane diol, 34.29 parts of the surface reformed black pigment dispersion of Preparation Example 1, 12.66 parts of resin emulsion 1 of manufacturing example, 0.30 parts of wax (polyethylene wax, AQUACER 531), and a balance of pure water to make the entire 100 parts were added to the homogeneous mixture and stirred for 60 minutes to obtain a homogeneous ink. The thus-obtained ink was filtrated with a polyvinylidene fluoride membrane filter having an average opening diameter of 1.2 μm with an increased pressure to remove coarse particles and dust. Thus, ink of Example 1 was prepared.

Example 2-16, and Comparative Example 1-12

The inks of Examples 2 to 16 and Comparative Examples 1 to 12 were prepared in the same manner as in Example 1 except that the compositions shown in Tables 3-1 to 3-6 below were changed.

TABLES 3-1

| Component (percent by mass) | | | Example 1 | Example 2 | Example 3 | Example 4 | Example 5 |
|---|---|---|---|---|---|---|---|
| Water-dispersible coloring material (pigment dispersion) | | Preparation Example 1 (Carbon black Nipex 150) | 34.29 | 34.29 | 22.86 | 22.86 | 22.86 |
| | | Preparation Example 2 (C.I. Pigment Red 122) | | | | | |
| | | Preparation Example 3 (C.I. Pigment Red 122) | | | | | |
| | | Preparation Example 4 (C.I. Pigment Blue 15:3) | | | | | |
| Water-dispersible resin | | Resin emulsion 1 (Tg: 30 degrees C.) | 12.66 | 12.63 | 17.77 | 17.77 | 17.77 |
| | | Resin emulsion 2 (Tg: 45 degrees C.) | | | | | |
| Organic solvent | Organic solvent | Chemical structure (I) 3-n-buthoxy-N,N-dimethyl propanamide (SP value: 9.03) | 15.00 | | | | |
| | | Chemical structure (IV) 3-ethyl-3-hydroxyl methyl oxetane (SP value: 11.3) | | | 27.50 | 27.50 | 27.50 |
| | | 3-Methyl-1,3-butane diol (SP value: 12.05) | | | | | |
| | | 1,2-butane diol (SP value: 12.75) | | 20.00 | 10.00 | 10.00 | 10.00 |
| | | 1,2-Propane diol (SP value: 13.5) | 20.00 | 20.00 | | | |
| | Humectant | Glycerin (SP value: 16.38) | | | | | |
| | | Triethylene glycol (SP value: 8.41) | | | | | |
| | Permeating agent | 2-ethyl-1,3-hexanediol (SP value: 10.6) | | | 2.00 | 2.00 | 2.00 |
| | | 2,2,4-trimethyl-1,3-pentanediol (SP value: 10.8) | | 4.00 | | | |
| Surfactant | Polyether-modified siloxane compound | Chemical formula II (Silface SAG-002) | 0.50 | | | | |
| | | Chemical formula III (Silface SAG-013) | | 0.25 | | | |
| | | Chemical formula VIII (Silface SAG-003) | | | 0.95 | 0.50 | 0.50 |
| | | Chemical formula VIII (Silface SAG-503A) | | | | | |
| | | Chemical formula VIII (BYK-348) | | | | | |
| | | Chemical formula V (TEGO Wet 270) | | | | | |
| | Aliphatic alcohol alkylene oxide compound | Chemical formula VI (Newcol NT-5) | 0.25 | | | | |
| | | Chemical formula VI (NOIGEN XL-40) | | 0.25 | | | |
| | | Chemical formula VI (NOIGEN TDX-50) | | | 0.05 | 0.50 | 0.10 |
| | | Chemical formula VI (NOIGEN ET-65) | | | | | |
| | | Chemical formula VII (Synthesis Example 1: A-1) | | | | | |
| | | Chemical formula VII (Synthesis Example 6: A-6) | | | | | |

TABLES 3-1-continued

| Component (percent by mass) | | Example 1 | Example 2 | Example 3 | Example 4 | Example 5 |
|---|---|---|---|---|---|---|
| | Chemical formula VII (Synthesis Example 9: A-9) | | | | | |
| | Surfynol 104E | | | | | |
| Mildew-proofing agent | Proxel GXL | 0.05 | 0.05 | 0.05 | 0.05 | 0.05 |
| Defoaming Agent | 2,4,7,9-tetramethyldecane-4,7-diol | 0.40 | 0.40 | 0.40 | 0.40 | 0.40 |
| | 2,5,8,11-tetramethyldodecane-5,8-diol | | | | | |
| pH regulator | 2-amino-2-ethyl-1,3-propane diol | 0.20 | 0.20 | 0.20 | 0.20 | 0.20 |
| Wax | Polyethylene wax (AQUACER 531) | 0.30 | 0.30 | 0.30 | 0.30 | 0.30 |
| | Polyethylene wax (AQUACER 515) | | | | | |
| | Pure water | Rest | Rest | Rest | Rest | Rest |

TABLES 3-2

| Component (percent by mass) | | | Example 6 | Example 7 | Example 8 | Example 9 | Example 10 |
|---|---|---|---|---|---|---|---|
| Water-dispersible coloring material (pigment dispersion) | | Preparation Example 1 (Carbon black Nipex 150) | 17.17 | 34.29 | | 17.14 | 30.00 |
| | | Preparation Example 2 (C.I. Pigment Red 122) | | | | | |
| | | Preparation Example 3 (C.I. Pigment Red 122) | | | 34.29 | | |
| | | Preparation Example 4 (C.I. Pigment Blue 15:3) | | | | | |
| Water-dispersible resin | | Resin emulsion 1 (Tg: 30 degrees C.) | 20.15 | 12.66 | 12.63 | 17.14 | 30.00 |
| | | Resin emulsion 2 (Tg: 45 degrees C.) | | | | | |
| Organic solvent | Organic solvent | Chemical structure (I) 3-n-buthoxy-N,N-dimethyl propanamide (SP value: 9.03) | | 10.00 | | | |
| | | Chemical structure (IV) 3-ethyl-3-hydroxyl methyl oxetane (SP value: 11.3) | 5.00 | | 15.00 | 10.00 | 10.00 |
| | | 3-Methyl-1,3-butane diol (SP value: 12.05) | 30.00 | 15.00 | 20.00 | 25.00 | 20.00 |
| | | 1,2-butane diol (SP value: 12.75) | | | | | |
| | | 1,2-Propane diol (SP value: 13.5) | | 10.00 | | | |
| | Humectant | Glycerin (SP value: 16.38) | | | | | |
| | | Triethylene glycol (SP value: 8.41) | | | | | |
| | Permeating agent | 2-ethyl-1,3-hexanediol (SP value: 10.6) | 2.00 | 1.00 | 2.00 | 2.00 | 2.00 |
| | | 2,2,4-trimethy 1-1,3-pentanediol (SP value: 10.8) | | | | | |
| Surfactant | Polyether-modified siloxane compound | Chemical formula II (Silface SAG-002) | | | | | |
| | | Chemical formula III (Silface SAG-013) | | | | | |
| | | Chemical formula VIII (Silface SAG-003) | | | | | |
| | | Chemical formula VIII (Silface SAG-503A) | 0.50 | | | 1.00 | |
| | | Chemical formula VIII (BYK-348) | | 0.50 | | | |
| | | Chemical formula V (TEGO Wet 270) | | | | 0.35 | 1.20 |

TABLES 3-2-continued

| Component (percent by mass) | | | Example | | | | |
|---|---|---|---|---|---|---|---|
| | | | 6 | 7 | 8 | 9 | 10 |
| Aliphatic alcohol alkylene oxide compound | Chemical formula VI (Newcol NT-5) | | | 0.30 | | | |
| | Chemical formula VI (NOIGEN XL-40) | | | | | 0.20 | |
| | Chemical formula VI (NOIGEN TDX-50) | | | | | | 0.20 |
| | Chemical formula VI (NOIGEN ET-65) | | 0.20 | | 0.15 | | |
| | Chemical formula VII (Synthesis Example 1: A-1) | | | | | | |
| | Chemical formula VII (Synthesis Example 6: A-6) | | | | | | |
| | Chemical formula VII (Synthesis Example 9: A-9) | | | | | | |
| | Surfynol 104E | | | | | | |
| Mildew-proofing agent | Proxel GXL | | 0.05 | 0.05 | 0.05 | 0.05 | 0.05 |
| Defoaming Agent | 2,4,7,9-tetramethyldecane-4,7-diol | | 0.40 | 0.40 | 0.40 | 0.40 | 0.40 |
| | 2,5,8,11-tetramethyldodecane-5,8-diol | | | | | | |
| pH regulator | 2-amino-2-ethyl-1,3-propane diol | | 0.20 | 0.20 | 0.20 | 0.20 | 0.20 |
| Wax | Polyethylene wax (AQUACER 531) | | 0.30 | 0.30 | 0.30 | 0.30 | 0.30 |
| | Polyethylene wax (AQUACER 515) | | | | | | |
| | Pure water | | Rest | Rest | Rest | Rest | Rest |

TABLES 3-3

| Component (percent by mass) | | | Example | | | | | |
|---|---|---|---|---|---|---|---|---|
| | | | 11 | 12 | 13 | 14 | 15 | 16 |
| Water-dispersible coloring material (pigment dispersion) | Preparation Example 1 (Carbon black Nipex 150) | | 30.00 | 15.00 | 20.00 | 32.50 | 12.50 | 15.00 |
| | Preparation Example 2 (C.I. Pigment Red 122) | | | | | | | |
| | Preparation Example 3 (C.I. Pigment Red 122) | | | | | | | |
| | Preparation Example 4 (C.I. Pigment Blue 15:3) | | | | | | | |
| Water-dispersible resin | Resin emulsion 1 (Tg: 30 degrees C.) | | 30.00 | 20.25 | 17.72 | 11.34 | 21.41 | 20.15 |
| | Resin emulsion 2 (Tg: 45 degrees C.) | | | | | | | |
| Organic solvent | Organic solvent | Chemical structure (I) 3-n-buthoxy-N,N-dimethyl propanamide (SP value: 9.03) | | | | | | |
| | | Chemical structure (IV) 3-ethyl-3-hydroxyl methyl oxetane (SP value: 11.3) | 10.00 | 10.00 | 10.00 | 15.00 | 15.00 | 15.00 |
| | | 3-Methyl-1,3-butane diol (SP value: 12.05) | 20.00 | 25.00 | 25.00 | 15.00 | 20.00 | 20.00 |
| | | 1,2-butane diol (SP value: 12.75) | | | | | | |
| | | 1,2-Propane diol (SP value: 13.5) | | | | | | |
| | Humectant | Glycerin (SP value: 16.38) | | | | | | |
| | | Triethylene glycol (SP value: 8.41) | | | | | | |
| | Permeating agent | 2-ethyl-1,3-hexanediol (SP value: 10.6) | 2.00 | 2.00 | 2.00 | 2.00 | 2.00 | 2.00 |
| | | 2,2,4-trimethyl-1,3-pentanediol (SP value: 10.8) | | | | | | |
| Surfactant | Polyether-modified siloxane compound | Chemical formula II (Silface SAG-002) | | | | | | |
| | | Chemical formula III (Silface SAG-013) | | | | | | |

TABLES 3-3-continued

| Component (percent by mass) | | | Example 11 | Example 12 | Example 13 | Example 14 | Example 15 | Example 16 |
|---|---|---|---|---|---|---|---|---|
| | | Chemical formula VIII (Silface SAG-003) | | | | | | |
| | | Chemical formula VIII (Silface SAG-503A) | | 0.40 | | 0.50 | | |
| | | Chemical formula VIII (BYK-348) | 0.40 | | | | 0.40 | |
| | | Chemical formula V (TEGO Wet 270) | | | 0.50 | | | 0.40 |
| | Aliphatic alcohol alkylene oxide compound | Chemical formula VI (Newcol NT-5) | | | | | | |
| | | Chemical formula VI (NOIGEN XL-40) | | 0.30 | 0.40 | | | |
| | | Chemical formula VI (NOIGEN TDX-50) | | | | | | |
| | | Chemical formula VI (NOIGEN ET-65) | 0.20 | | | | | |
| | | Chemical formula VII (Synthesis Example 1: A-1) | | | | 0.20 | | |
| | | Chemical formula VII (Synthesis Example 6: A-6) | | | | | 0.20 | |
| | | Chemical formula VII (Synthesis Example 9: A-9) | | | | | | 0.15 |
| | | Surfynol 104E | | | | | | |
| Mildew-proofing agent | | Proxel GXL | 0.05 | 0.05 | 0.05 | 0.05 | 0.05 | 0.05 |
| Defoaming Agent | | 2,4,7,9-tetramethyldecane-4,7-diol | 0.40 | 0.40 | 0.40 | 0.40 | 0.40 | 0.40 |
| | | 2,5,8,11-tetramethyldodecane-5,8-diol | | | | | | |
| pH regulator | | 2-amino-2-ethyl-1,3-propane diol | 0.20 | 0.20 | 0.20 | 0.20 | 0.20 | 0.20 |
| Wax | | Polyethylene wax (AQUACER 531) | 0.30 | 0.30 | 0.30 | 0.30 | 0.30 | 0.30 |
| | | Polyethylene wax (AQUACER 515) | | | | | | |
| | | Pure water | Rest | Rest | Rest | Rest | Rest | Rest |

TABLES 3-4

| Component (percent by mass) | | | Comparative Example 1 | Comparative Example 2 | Comparative Example 3 | Comparative Example 4 |
|---|---|---|---|---|---|---|
| Water-dispersible coloring material (pigment dispersion) | | Preparation Example 1 (Carbon black Nipex 150) | 34.29 | 34.29 | 22.86 | 17.17 |
| | | Preparation Example 2 (C.I. Pigment Red 122) | | | | |
| | | Preparation Example 3 (C.I. Pigment Red 122) | | | | |
| | | Preparation Example 4 (C.I. Pigment Blue 15:3) | | | | |
| Water-dispersible resin | | Resin emulsion 1 (Tg: 30 degrees C.) | 12.66 | 12.63 | 17.77 | 20.15 |
| | | Resin emulsion 2 (Tg: 45 degrees C.) | | | | |
| Organic solvent | Organic solvent | Chemical structure (I) 3-n-buthoxy-N,N-dimethyl propanamide (SP value: 9.03) | 15.00 | | | |
| | | Chemical structure (IV) 3-ethyl-3-hydroxyl methyl oxetane (SP value: 11.3) | | | 27.50 | 5.00 |
| | | 3-Methyl-1,3-butane diol (SP value: 12.05) | | | | 30.00 |
| | | 1,2-butane diol (SP value: 12.75) | | 20.00 | 10.00 | |
| | | 1,2-Propane diol (SP value: 13.5) | 20.00 | 20.00 | | |
| | Humectant | Glycerin (SP value: 16.38) | | | | |
| | | Triethylene glycol (SP value: 8.41) | | | | |

TABLES 3-4-continued

|  |  |  | Comparative Example | | | |
|---|---|---|---|---|---|---|
| Component (percent by mass) | | | 1 | 2 | 3 | 4 |
|  | Permeating agent | 2-ethyl-1,3-hexanediol (SP value: 10.6) |  |  | 2.00 | 2.00 |
|  |  | 2,2,4-trimethyl-1,3-pentanediol (SP value: 10.8) |  | 4.00 |  |  |
| Surfactant | Polyether-modified siloxane compound | Chemical formula II (Silface SAG-002) | 0.20 |  |  |  |
|  |  | Chemical formula III (Silface SAG-013) |  | 1.00 |  |  |
|  |  | Chemical formula VIII (Silface SAG-003) |  |  | 0.04 |  |
|  |  | Chemical formula VIII (Silface SAG-503A) |  |  |  |  |
|  |  | Chemical formula VIII (BYK-348) |  |  |  | 1.60 |
|  |  | Chemical formula V (TEGO Wet 270) |  |  |  |  |
|  | Aliphatic alcohol alkylene oxide compound | Chemical formula VI (Newcol NT-5) | 1.00 |  |  |  |
|  |  | Chemical formula VI (NOIGEN XL-40) |  | 1.50 |  |  |
|  |  | Chemical formula VI (NOIGEN TDX-50) |  |  | 0.05 |  |
|  |  | Chemical formula VI (NOIGEN ET-65) |  |  |  |  |
|  |  | Chemical formula VII (Synthesis Example 1: A-1) |  |  |  |  |
|  |  | Chemical formula VII (Synthesis Example 6: A-6) |  |  |  | 0.05 |
|  |  | Chemical formula VII (Synthesis Example 9: A-9) |  |  |  |  |
|  |  | Surfynol 104E |  |  |  |  |
| Mildew-proofing agent | | Proxel GXL | 0.05 | 0.05 | 0.05 | 0.05 |
| Defoaming Agent | | 2,4,7,9-tetramethyldecane-4,7-diol | 0.40 | 0.40 | 0.40 | 0.40 |
|  |  | 2,5,8,11-tetramethyldodecane-5,8-diol |  |  |  |  |
| pH regulator | | 2-amino-2-ethyl-1,3-propane diol | 0.20 | 0.20 | 0.20 | 0.20 |
| Wax | | Polyethylene wax (AQUACER 531) | 0.30 | 0.30 | 0.30 | 0.30 |
|  |  | Polyethylene wax (AQUACER 515) |  |  |  |  |
| Pure water | | | Rest | Rest | Rest | Rest |

TABLES 3-5

|  |  | Comparative Example | | | |
|---|---|---|---|---|---|
| Component (percent by mass) | | 5 | 6 | 7 | 8 |
| Water-dispersible coloring material (pigment dispersion) | Preparation Example 1 (Carbon black Nipex 150) |  |  |  |  |
|  | Preparation Example 2 (C.I. Pigment Red 122) |  |  | 34.29 | 34.29 |
|  | Preparation Example 3 (C.I. Pigment Red 122) |  |  |  |  |
|  | Preparation Example 4 (C.I. Pigment Blue 15:3) | 13.14 | 13.14 |  |  |
| Water-dispersible resin | Resin emulsion 1 (Tg: 30 degrees C.) |  |  |  |  |
|  | Resin emulsion 2 (Tg: 45 degrees C.) | 20.25 | 20.25 | 12.66 | 12.66 |
| Organic solvent | Organic solvent | Chemical structure (I) 3-n-buthoxy-N,N-dimethyl propanamide (SP value: 9.03) |  |  |  |  |
|  |  | Chemical structure (IV) 3-ethyl-3-hydroxyl methyl oxetane (SP value: 11.3) | 15.00 | 15.00 |  |  |

TABLES 3-5-continued

| | Component (percent by mass) | | Comparative Example | | | |
|---|---|---|---|---|---|---|
| | | | 5 | 6 | 7 | 8 |
| | Humectant | 3-Methyl-1,3-butane diol (SP value: 12.05) | 20.00 | 20.00 | 30.00 | 30.00 |
| | | 1,2-butane diol (SP value: 12.75) | | | | |
| | | 1,2-Propane diol (SP value: 13.5) | | | | |
| | | Glycerin (SP value: 16.38) | | | 10.00 | 10.00 |
| | | Triethylene glycol (SP value: 8.41) | | | | |
| | Permeating agent | 2-ethyl-1,3-hexanediol (SP value: 10.6) | 2.00 | | 2.00 | 2.00 |
| | | 2,2,4-trimethyl-1,3-pentanediol (SP value: 10.8) | | | | |
| Surfactant | Polyether-modified siloxane compound | Chemical formula II (Silface SAG-002) | | | | |
| | | Chemical formula III (Silface SAG-013) | | | | |
| | | Chemical formula VIII (Silface SAG-003) | | | | |
| | | Chemical formula VIII (Silface SAG-503A) | | | | |
| | | Chemical formula VIII (BYK-348) | | | | |
| | | Chemical formula V (TEGO Wet 270) | 2.00 | | | 0.50 |
| | Aliphatic alcohol alkylene oxide compound | Chemical formula VI (Newcol NT-5) | | | | |
| | | Chemical formula VI (NOIGEN XL-40) | | 2.00 | | |
| | | Chemical formula VI (NOIGEN TDX-50) | | | | |
| | | Chemical formula VI (NOIGEN ET-65) | | | | |
| | | Chemical formula VII (Synthesis Example 1: A-1) | | | | |
| | | Chemical formula VII (Synthesis Example 6: A-6) | | | | |
| | | Chemical formula VII (Synthesis Example 9: A-9) | | | | |
| | | Surfynol 104E | | | 1.00 | 0.50 |
| Mildew-proofing agent | | Proxel GXL | 0.05 | 0.05 | 0.05 | 0.05 |
| Defoaming Agent | | 2,4,7,9-tetramethyldecane-4,7-diol | 0.40 | 0.40 | | |
| | | 2,5,8,11-tetramethyldodecane-5,8-diol | | | 0.40 | 0.40 |
| pH regulator | | 2-amino-2-ethyl-1,3-propane diol | 0.20 | 0.20 | 0.10 | 0.10 |
| Wax | | Polyethylene wax (AQUACER 531) | | | 0.22 | 0.22 |
| | | Polyethylene wax (AQUACER 515) | 0.43 | 0.43 | | |
| | Pure water | | Rest | Rest | Rest | Rest |

TABLES 3-6

| | Component (percent by mass) | Comparative Example | | | |
|---|---|---|---|---|---|
| | | 9 | 10 | 11 | 12 |
| Water-dispersible coloring material (pigment dispersion) | Preparation Example 1 (Carbon black Nipex 150) | | | | |
| | Preparation Example 2 (C.I. Pigment Red 122) | 34.29 | 34.29 | 34.29 | 34.29 |
| | Preparation Example 3 (C.I. Pigment Red 122) | | | | |
| | Preparation Example 4 (C.I. Pigment Blue 15:3) | | | | |
| Water-dispersible resin | Resin emulsion 1 (Tg: 30 degrees C.) | | | | |
| | Resin emulsion 2 (Tg: 45 degrees C.) | 12.66 | 12.66 | 12.66 | 12.66 |

TABLES 3-6-continued

| Component (percent by mass) | | | Comparative Example | | | |
|---|---|---|---|---|---|---|
| | | | 9 | 10 | 11 | 12 |
| Organic solvent | Organic solvent | Chemical structure (I) 3-n-buthoxy-N,N-dimethyl propanamide (SP value: 9.03) | | | | |
| | | Chemical structure (IV) 3-ethyl-3-hydroxyl methyl oxetane (SP value: 11.3) | | | | |
| | | 3-Methyl-1,3-butane diol (SP value: 12.05) | 30.00 | 30.00 | 30.00 | 30.00 |
| | | 1,2-butane diol (SP value: 12.75) | | | | |
| | | 1,2-Propane diol (SP value: 13.5) | | | | |
| | Humectant | Glycerin (SP value: 16.38) | 10.00 | 10.00 | 10.00 | 10.00 |
| | | Triethylene glycol (SP value: 8.41) | | | | |
| | Permeating agent | 2-ethyl-1,3-hexanediol (SP value: 10.6) | 2.00 | 2.00 | 2.00 | 2.00 |
| | | 2,2,4-trimethyl-1,3-pentanediol (SP value: 10.8) | | | | |
| Surfactant | Polyether-modified siloxane compound | Chemical formula II (Silface SAG-002) | | | | |
| | | Chemical formula III (Silface SAG-013) | | | | |
| | | Chemical formula VIII (Silface SAG-003) | | | | |
| | | Chemical formula VIII (Siltace SAG-503A) | | | | |
| | | Chemical formula VIII (BYK-348) | | | | |
| | | Chemical formula V (TEGO Wet 270) | | 0.50 | | |
| | Aliphatic alcohol alkylene oxide compound | Chemical formula VI (Newcol NT-5) | | | | |
| | | Chemical formula VI (NOIGEN XL-40) | 0.50 | | 0.50 | |
| | | Chemical formula VI (NOIGEN TDX-50) | | | | |
| | | Chemical formula VI (NOIGEN ET-65) | | | | |
| | | Chemical formula VII (Synthesis Example 1: A-1) | | | | |
| | | Chemical formula VII (Synthesis Example 6: A-6) | | | | |
| | | Chemical formula VII (Synthesis Example 9: A-9) | | | | |
| | | Surfynol 104E | 0.50 | | | 0.50 |
| Mildew-proofing agent | | Proxel GXL | 0.05 | 0.05 | 0.05 | 0.05 |
| Defoaming Agent | | 2,4,7,9-tetramethyldecane-4,7-diol | | | | |
| | | 2,5,8,11-tetramethyldodecane-5,8-diol | 0.40 | 0.40 | 0.40 | 0.40 |
| pH regulator | | 2-amino-2-ethyl-1,3-propane diol | 0.10 | 0.10 | 0.10 | 0.10 |
| Wax | | Polyethylene wax (AQUACER 531) | 0.22 | 0.22 | 0.22 | 0.22 |
| | | Polyethylene wax (AQUACER 515) | | | | |
| | | Pure water | Rest | Rest | Rest | Rest |

Abbreviations shown in Tables 3-1 to 3-6 are explained as follows:

Organic solvent (3-n-buthoxy-N,N-dimethyl propanamide) represented by the following Chemical structure I

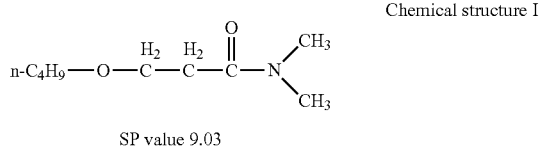

SP value 9.03

Organic solvent (3-ethyl-3-hydroxymethyl oxetane) represented by the following Chemical structure IV

SP value 11.3

Surfactants of Silface SAG002, Silface SAG013, Silface SAG003, and Silface SAG503A are polyether-modified siloxane compounds (effective component of 100 percent by mass, manufactured by Nissin Chemical co., ltd.

Surfactant of BYK-348: polyether-modified siloxane compound (effective component of 100 percent by mass, manufactured by BYK Japan KK.)

Surfactant of TEGO Wet 270: polyether-modified siloxane compound (effective component of 100 percent by mass, manufactured by Evonik Industries AG)

Surfactant of Newcol NT-5: aliphatic alcohol alkylene oxide compound (effective component of 100 percent by mass, manufactured by Nippon Nyukazai Co., Ltd.)

Surfactant: NOIGEN XL-40: aliphatic alcohol alkylene oxide compound (effective component of 100 percent by mass, manufactured by DKS Co. Ltd.)

Surfactant of Newcol TDX-50: aliphatic alcohol alkylene oxide compound (effective component of 100 percent by mass, manufactured by Nippon Nyukazai Co., Ltd.)

Surfactant of NOIGEN ET-65: aliphatic alcohol alkylene oxide compound (effective component of 100 percent by mass, manufactured by Nippon Nyukazai Co., Ltd.)

Surfactant: Surfynol 104E: acetylene glycol compound (effective component of 50 percent by mass, manufactured by Nisshin Chemical Co., Ltd.)

PROXEL GXL: mildew-proofing agent mainly composed of 1,2-benzisothiazolin-3-one (component: 20% by mass, containing dipropylene glycol, manufactured by Avecia)

Wax 1: AQUACER 531 (oxidized polyethylene wax emulsion, effective component of 45 percent by mass, manufactured by BYK Japan KK.).

Wax 2: AQUACER 515 (oxidized polyethylene wax emulsion, effective component of 35 percent by mass, manufactured by BYK Japan KK.).

Properties of the inks prepared in Examples 1 to 16 and Comparative Examples 1 to 12 were measured in the following manner. The results are shown in Table 4.

Measuring of Dynamic Surface Tension

Dynamic surface tension of the ink of the present disclosure was measured at 25° C. at a surface life of 15 msec by SITA_DynoTester (manufactured by SITA Messtechnik GmbH) as measured by maximum bubble pressure technique.

Static Surface Tension

Static surface tension of each ink was measured at 25° C. using an automatic surface tensiometer (DY-300, manufactured by KYOWA INTERFACE SCIENCE Co., Ltd.).

Foam Producing Property and Defoamability

Foam producing and defoamability test was used as a substitution test for printer initial filling property and maintenance property.

1. Foamabilitty 10 ml of evaluation ink was loaded in 100 mL measuring cylinder. Thereafter, the measuring cylinder was dipped in a hemathermal water tank at 10° C. for 30 minutes or longer to stabilize the liquid temperature of the ink to be evaluated. Thereafter, an air infusion tube having an inner diameter of 1 mm was attached to the measuring cylinder and the front end of the air infusion tube was attached at 5 mm from the base of the ink. Moreover, the air pressure of a pressure device was set at 20 gf/cm², and the height of the foam was measured by scale of the measuring cylinder at 30 seconds measured by a stopwatch after the valve of the pressure device was opened. Foam producing property was evaluated according to the following criteria. The grades A and B are allowable.

Example: when the scale indicates 100 mL, the record is 90 mL {100–10 (sample amount)}

If the height of foam reaches 100 ml in less than 30 seconds, the foam producing test is aborted.

Evaluation Criteria

A: Height of foam: less than 50 mL

B: Height of foam from 50 to 90 mL

C: Height of foam reached 100 mL less than 30 seconds

2. Defoamability

In the foam producing test, after blowing air into the measuring cylinder for 30 seconds, the valve of the pressure device was quickly closed to observe foams naturally disappearing and the height of the foam was measured at 300 seconds. The grades A and B are allowable.

Evaluation Criteria

A: Less than 50 mL immediately after cease of blowing air

B: Less than 50 mL at 300 seconds

C: Not less than 50 mL at 300 seconds

Image Forming

Under an environment at 22.5 to 23.5° C. and 45 to 55 percent RH, using an image forming apparatus (IPSiO GXe-5500, manufactured by RICOH CO., LTD.), the drive voltage of the piezo element was changed to discharge the same amount of ink in order to attach the same amount of the ink onto OK topcoat+ (weight: 104.7 g/m², OJI PAPER CO., LTD.) as recording medium.

Next, properties were evaluated in the following manner regarding Examples 1 to 16 and Comparative Examples 1 to 12. The results are shown in Table 4.

Beading

The print mode used was modified from "Gloss paper—Aesthetic" to "No Color Calibration" by the driver installed onto the printer. Solid images ("black square" which is a 64 point character created using Microsoft Word 2000) were printed to OK TOP COAT+ (weight: 104.7 g/m², manufactured by OJI PAPER CO., LTD.) to visually check density uniformity (beading) of the solid image and evaluated according to the following criteria. In addition, "black squares" means a letter (symbol) painted black inside the square. The grades A and B are allowable.

Evaluation Criteria
A: Not at all
B: Slightly observed
C: Fairly observed
D: Significantly observed Since the black solid image was very difficult for visual confirmation, it was observed by an optical microscope with a magnifying power of 40 times.

Discharging Stability 1: Intermittent Discharging Evaluation 1

A chart of solid image having an area ratio of 5 percent of A4 size paper per color created by MICROSOFT WORD 2000 was continuously printed on MyPaper (manufactured by RICOH CO., LTD.) with a run length of 200 sheets. Disturbance of ink discharging by each nozzle after the printing was observed to evaluate discharging stability according to the following criteria. The print mode used: A modified mode in which "Plain Paper—Standard Fast" was modified to "No Color Calibration" from the user setting for plain paper by the driver installed onto the printer. The grades A and B are allowable.

Evaluation Criteria
A: No discharging disturbance
B: Slight discharging disturbance observed
C: Discharging disturbance observed or no discharging observed Discharging Stability 2: Intermittent Discharging Evaluation 2

A chart of halftone image having an area ratio of 60 percent of A4 size paper per color created by MICROSOFT WORD 2000 was continuously printed on MyPaper (manufactured by RICOH CO., LTD.) with a run length of 200 sheets. Disturbance of ink discharging by each nozzle after the printing was observed to evaluate discharging stability according to the following criteria. The print mode used: A modified mode in which "Plain Paper—Standard Fast" was modified to "No Color Calibration" from the user setting for plain paper by the driver installed onto the printer. The grades A and B are allowable.

Evaluation Criteria
A: No discharging disturbance
B: Slight discharging disturbance observed
C: Discharging disturbance observed or no discharging observed
D: A large number discharging disturbance observed Initial Filling Property An inkjet printer (IPSiO GXe-5500, manufactured by RICOH CO., LTD.) which was filled with no ink was filled with the ink. Immediately after the ink filling, the nozzle check pattern was printed based on print setting maintenance to check nozzle omission and evaluate the initial filling property according to the following evaluation criteria. The grades A and B are allowable.

Evaluation Criteria
A: No nozzle omission
B: less than 10 non-discharging nozzles
C: 10 or more and less than 30 non-discharging nozzles
D: 30 or more non-discharging nozzles

TABLES 4

| | Ink Property values | | Evaluation results | | | | | |
|---|---|---|---|---|---|---|---|---|
| | 15 msec dynamic surface tension (mN/m) | Static surface tension (mN/m) | Foamability | Defoamability | Beading | Discharging Stability 1 | Discharging Stability 2 | Initial Filling Property |
| Example 1 | 31.7 | 23.5 | B | A | A | A | A | A |
| Example 2 | 32.5 | 24.3 | B | A | A | A | B | B |
| Example 3 | 32.5 | 26.1 | B | A | B | A | A | B |
| Example 4 | 33.2 | 25.7 | B | A | B | A | A | B |
| Example 5 | 33.4 | 25.5 | A | A | A | A | A | A |
| Example 6 | 31.2 | 24.5 | A | A | A | A | A | A |
| Example 7 | 31.9 | 23.4 | B | A | A | A | B | B |
| Example 8 | 32.6 | 22.8 | B | A | A | A | A | A |
| Example 9 | 29.8 | 21.6 | A | A | A | A | A | A |
| Example 10 | 30.5 | 22.4 | A | A | A | A | A | A |
| Example 11 | 32.1 | 23.1 | B | A | A | A | A | A |
| Example 12 | 33.7 | 24.5 | B | A | A | A | A | B |
| Example 13 | 32.2 | 23.6 | B | A | A | A | A | B |
| Example 14 | 31.9 | 22.5 | A | A | A | A | A | A |
| Example 15 | 32.2 | 23.1 | B | A | A | A | A | B |
| Example 16 | 31.9 | 21.5 | A | A | A | A | A | A |
| Comparative Example 1 | 33.2 | 23.1 | A | A | A | A | C | A |
| Comparative Example 2 | 30.1 | 21.2 | B | A | A | B | C | A |
| Comparative Example 3 | 33.5 | 24.6 | A | A | A | A | C | A |
| Comparative Example 4 | 30.9 | 20.5 | B | B | A | A | C | A |
| Comparative Example 5 | 30.1 | 21.5 | C | B | A | C | D | D |
| Comparative Example 6 | 34.8 | 31.6 | A | A | D | B | A | A |
| Comparative Example 7 | 30.5 | 26.3 | A | A | C | A | A | A |
| Comparative Example 8 | 30.9 | 22.3 | B | C | A | B | D | B |

TABLES 4-continued

| | Ink Property values | | Evaluation results | | | | | |
|---|---|---|---|---|---|---|---|---|
| | 15 msec dynamic surface tension (mN/m) | Static surface tension (mN/m) | Foamability | Defoamability | Beading | Discharging Stability 1 | Discharging Stability 2 | Initial Filling Property |
| Comparative Example 9 | 31.2 | 27.3 | A | A | C | A | A | A |
| Comparative Example 10 | 29.2 | 20.3 | C | C | A | C | D | D |
| Comparative Example 11 | 30.5 | 21.6 | C | C | A | C | D | D |
| Comparative Example 12 | 29.7 | 20.9 | C | C | A | C | D | D |

What is claimed is:

1. An ink, comprising:
at least one polyether-modified siloxane compound; and
at least one aliphatic alcohol alkylene oxide compound;
wherein a mass ratio of the polyether-modified siloxane compound to the aliphatic alcohol alkylene oxide compound in the ink is from 95/5 to 65/35.

2. The ink of claim 1,
wherein a total proportion of the polyether-modified siloxane compound and the aliphatic alcohol alkylene oxide compound by mass ranges from 0.01% to 3.0% relative to a total mass of the ink.

3. The ink of claim 1,
wherein the polyether-modified siloxane compound is at least one compound represented by formula I:

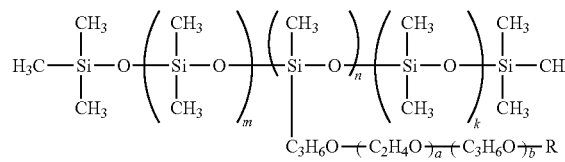

I where m represents 0 or an integer of from 1 to 23, n represents an integer of from 1 to 10, and k represents 0 or an integer of from 1 to 7, a represents an integer of from 1 to 23, b represents 0 or an integer of from 1 to 23, and R represents a hydrogen atom or an alkyl group having 1 to 4 carbon atoms.

4. The ink of claim 3,
wherein the compound represented by formula I is a compound represented by any one of the following formulae II to V:

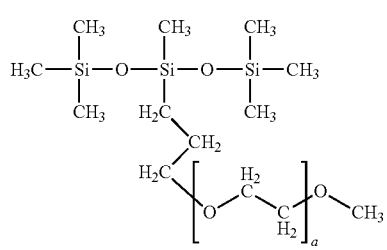

II where a represents an integer of from 2 to 17,

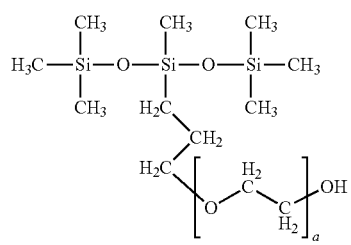

III where a represents an integer of from 2 to 17,

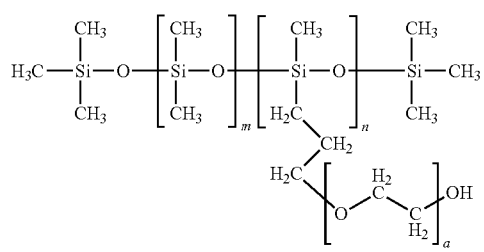

IV where m represents 0 or an integer of from 1 to 5, n represents an integer of from 1 to 2, and a represents an integer of from 3 to 17,

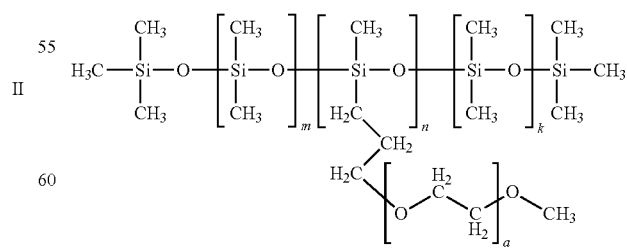

V where, m+k represents 0 or an integer of from 1 to 7, n represents an integer of from 1 to 2, and a represents an integer of from 2 to 16.

5. The ink of claim 1,
wherein the aliphatic alcohol alkylene oxide compound is at least one compound represented by formula VI or at least one compound represented by formula XII:

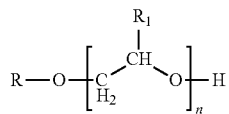

VI where R represents an alkyl group having 8 to 13 carbon atoms, $R_1$ represents a hydrogen atom or a methyl group, and n represents an integer of from 2 to 12,

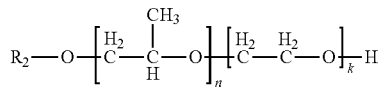

VII where $R_2$ represents an aliphatic hydrocarbon group having 6 to 10 carbon atoms, n represents a number of from 0 to 6 representing an average adduct number of propylene oxide, k represents a number of from 0 to 8 representing an average adduct number of ethylene oxide, and a total number of the propylene oxide and the ethylene oxide satisfies the following relation: $3 \leq n+k \leq 14$.

6. The ink of claim 1,
wherein the mass ratio of the polyether-modified siloxane compound to the aliphatic alcohol alkylene oxide compound is from 90/15 to 75/30.

7. A ink set, comprising:
a yellow ink;
a magenta ink; and
a cyan ink,
wherein the yellow ink, the magenta ink, and the cyan ink are each independently the ink of claim 1.

8. The ink set of claim 7, further comprising:
a black ink, which is also the ink of claim 1.

9. An ink container, comprising:
the ink of claim 1, and
a vessel to accommodate the ink.

10. An image forming method, comprising:
applying the ink of claim 1 to a recording medium.

11. An image forming apparatus, comprising:
the ink of claim 1; and
an applying device configured to apply the ink to a recording medium.

12. A recorded matter, comprising:
a printed layer comprising at least one polyether-modified siloxane compound and at least one aliphatic alcohol alkylene oxide compound,
wherein a mass ratio of the polyether-modified siloxane compound to the aliphatic alcohol alkylene oxide compound in the printed layer is from 95/5 to 65/35.

* * * * *